(12) United States Patent
Hartl et al.

(10) Patent No.: US 12,461,075 B2
(45) Date of Patent: Nov. 4, 2025

(54) SEPARATION METHOD AND SYSTEM FOR PREPARING TARGET COMPOUNDS

(71) Applicant: Hoffmann-La Roche Inc., Little Falls, NJ (US)

(72) Inventors: Maximilian Hartl, Penzberg (DE); Dinah Funke, Penzberg (DE)

(73) Assignee: HOFFMANN-LA ROCHE INC., Little Falls, NJ (US)

( * ) Notice: Subject to any disclaimer, the term of this patent is extended or adjusted under 35 U.S.C. 154(b) by 454 days.

(21) Appl. No.: 17/886,622

(22) Filed: Aug. 12, 2022

(65) Prior Publication Data

US 2022/0381750 A1 Dec. 1, 2022

Related U.S. Application Data

(63) Continuation of application No. PCT/EP2021/053429, filed on Feb. 12, 2021.

(30) Foreign Application Priority Data

Feb. 13, 2020 (EP) .................................... 20157222

(51) Int. Cl.
*G01N 30/62* (2006.01)
*C07K 1/18* (2006.01)
(Continued)

(52) U.S. Cl.
CPC .............. *G01N 30/62* (2013.01); *C07K 1/18* (2013.01); *C12N 7/00* (2013.01); *G01N 24/085* (2013.01);
(Continued)

(58) Field of Classification Search
None
See application file for complete search history.

(56) References Cited

U.S. PATENT DOCUMENTS 8,409,807 B2 * 4/2013 Neely .................. G01N 27/745
435/6.12
9,488,648 B2 * 11/2016 Neely .................. C12Q 1/6895
(Continued)

FOREIGN PATENT DOCUMENTS

EP 3102595 12/2016
JP 2001059827 3/2001
(Continued)

OTHER PUBLICATIONS

B. P. Hills et al.: "The Effects of Proteins on the Proton NMR Transverse Relaxation Times of Water", Molecular Physics, vol. 64, No. 4, 1989, pp. 903-918.
(Continued)

*Primary Examiner* — John E Breene
*Assistant Examiner* — Nigel H Plumb
(74) *Attorney, Agent, or Firm* — Woodard, Emhardt, Henry, Reeves & Wagner, LLP

(57) ABSTRACT

A separation method comprising: i) providing an aqueous solution comprising a target compound; ii) applying a separation step to the aqueous solution, thereby providing a plurality of fractions of the aqueous solution; iii) determining a concentration parameter indicating a concentration of the target compound in at least part of the fractions; iv) determining a nuclear magnetic resonance (NMR) parameter by applying an NMR measurement to the fractions, the NMR parameter indicating a nuclear magnetic spin relaxation in said at least part of the fractions; and v) determining a target parameter of said at least part of the fractions based on the concentration parameter and the nuclear magnetic resonance parameter. The present invention further relates to separation systems, uses, preparations, and methods related thereto.

23 Claims, 7 Drawing Sheets

Figure 1:
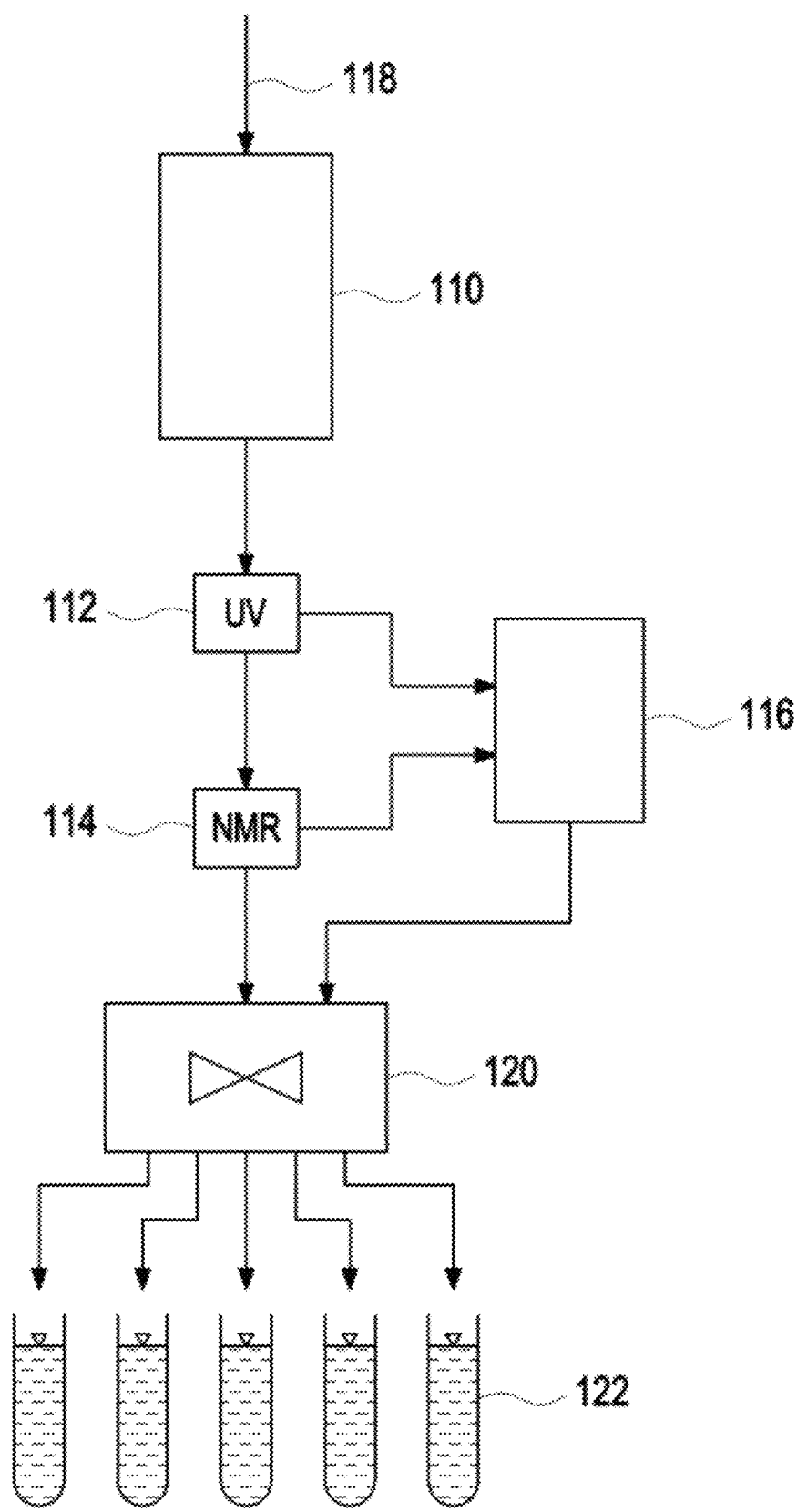

Specification includes a Sequence Listing.

(51) Int. Cl.
*C12N 7/00* (2006.01)
*G01N 24/08* (2006.01)
*G01N 30/14* (2006.01)
*G01N 30/88* (2006.01)
*G01R 33/44* (2006.01)
*C07K 1/16* (2006.01)
*G01N 30/02* (2006.01)
*G01R 33/465* (2006.01)

(52) U.S. Cl.
CPC ............ *G01N 30/14* (2013.01); *G01N 30/88* (2013.01); *G01R 33/448* (2013.01); *C07K 1/16* (2013.01); *C12N 2750/14151* (2013.01); *G01N 2030/027* (2013.01); *G01N 2030/8831* (2013.01); *G01R 33/465* (2013.01)

(56) References Cited

U.S. PATENT DOCUMENTS

| | | | |
|---|---|---|---|
| 10,072,083 B2 * | 9/2018 | Linke | A61K 39/3955 |
| 2011/0204894 A1 | 8/2011 | Kamlowski et al. | |

FOREIGN PATENT DOCUMENTS

| | | |
|---|---|---|
| JP | 2011092208 A | 5/2011 |
| JP | 2012215554 | 11/2012 |
| WO | WO 2003/075747 | 9/2003 |
| WO | WO 2012/015912 | 2/2012 |
| WO | WO 2014/169229 | 10/2014 |
| WO | WO 2016/118016 | 8/2016 |
| WO | WO 2018/102681 | 6/2018 |
| WO | WO 2018/184984 | 10/2018 |
| WO | WO 2019/016154 | 1/2019 |
| WO | WO-2019016154 A1 * | 1/2019 ......... B01D 15/1814 |

OTHER PUBLICATIONS

International Search Report and Written Opinion of PCT/EP2021/053429 mailed Apr. 16, 2021.
Marc B. Taraban et al.: "Flow Water Proton NMR: In-Line Process Analytical Technology for Continuous Biomanufacturing", Anal Chem, vol. 91, No. 21, Sep. 24, 2019, pp. 13538-13546.
Marc B. Taraban et al.: "Use of Water Proton NMR to Characterize Protein Aggregates: Gauging the Response and Sensitivity", Anal Chem, vol. 91, No. 6, Feb. 15, 2019, pp. 4107-4115.
Marc B. Taraban et al.: "Water Proton NMR for In Situ Detection of Insulin Aggregates", Journal of Pharma Sci, vol. 104, No. 12, Sep. 7, 2015, pp. 4132-4141.
Marc B. Taraban et al.: "Water Proton NMR: A Tool for Protein Aggregation Characterization", Anal Chem, vol. 89, Apr. 25, 2017, pp. 5494-5502.
Metz et al.: "Benchtop-NMR and MRI—A New Analytical Tool in Drug Delivery Research", International Journal of Pharmaceutics, vol. 364, 2008, pp. 170-175.
Shigemitsu et al.: "Nuclear Magnetic Resonance Evidence for the Dimer Formation of Beta Amyloid Peptide 1-42 in 1,1,1,3,3,3-hexafluoro-2-propanol", Anal Biochem, vol. 498, 2016, pp. 59-67.
Taraban et al.: 7th Annual PANIC Conference, Poster presentation P35: "Water Flow-NMR—A Prospective Contact-Free In-Line Analytical Tool for Continuous Biomanufacturing" 2019.
WHO Drug Information: International Nonproprietary Names for Pharmaceutical Substances, List 80, 2018, vol. 32, No. 3, p. 425-508.
Yue Feng et al.: "Water Proton NMR—a sensitive probe for solute association", Chem Commun, 2015, 51, Mar. 12, 2015, pp. 6804-6807.
Fu et al.: "Analytical Strategies for Quantification of Adeno-Associated Virus Empty Capsids to Support", Human Gene Therapy Methods, vol. 30 Issue 4, pp. 144-152.

* cited by examiner

| Designation | Cibisatamab (Antibody Like Protein 1) | IgG-IL2 (Antibody Like Protein 2) | PD1-IL2 (Antibody like Protein 3) | 2+1 bispecific fusion protein (Antibody Like Protein 4) |
|---|---|---|---|---|
| Schematic representation | | | | |
| Properties | - 2+1 N-terminal Fab Fusion<br>- bispecific | - IgG structure<br>- C-Terminal Cytokine Fusions<br>- bivalent | - IgG structure<br>- C-Terminal Cytokine Fusion<br>- bivalent | - 2+1 C-terminal Vh/Vl Fusion<br>- Bispecific |
| Mol. mass | 194 kDa | 175 kDa | 162 kDa | 173 kDa |

Fig. 2

SEPARATION METHOD AND SYSTEM FOR PREPARING TARGET COMPOUNDS 7660-4 sequencelisting.xml, created on Aug. 12, 2022, and comprising 39596 bytes, is submitted herewith and incorporated herein by reference.

The present invention relates to a separation method comprising: i) providing an aqueous solution comprising a target compound; ii) applying a separation step to the aqueous solution, thereby providing a plurality of fractions of the aqueous solution; iii) determining a concentration parameter indicating a concentration of the target compound in at least part of the fractions; iv) determining a nuclear magnetic resonance (NMR) parameter by applying an NMR measurement to the fractions, the NMR parameter indicating a nuclear magnetic spin relaxation in said at least part of the fractions; and v) determining a target parameter of said at least part of the fractions based on the concentration parameter and the nuclear magnetic resonance parameter. The present invention further relates to separation systems, uses, preparations, and methods related thereto.

TECHNICAL FIELD

The invention relates to a biochemical separation method, a separation system, and a use of the separation system. The methods and devices of the present invention may be used for separating a target compound from a solution comprising a range of compounds. As an example, the target compound may be a biomolecule, such as a protein, a nucleic acid, a virus, or a liposome. Other target compounds are also feasible. The target compound may specifically be used for therapeutic purposes, e.g. as an active pharmaceutical ingredient.

BACKGROUND ART

A wide range of biomolecules have proven to be of great therapeutic value. The production of biomolecules for therapeutic purposes, however, poses a number of challenges. In particular, the desired biomolecule must be provided at a high degree of purity, e.g. to guarantee safe use and to comply with legal regulations.

The sequence of steps in a production process, as well as the specific steps themselves, of therapeutic biomolecules are usually controlled on the basis of in-line acquired measurement data. In particular when using chromatographic separation methods, collecting the desired product during elution is often controlled on the basis of defined start and end values of measurements taken from the eluate of the separation means. The number of methods available for directly controlling the production process of biomolecules, however, is limited since the results must be available within a time range of seconds, or less. Typically, protein content of the eluate may be measured using UV absorption measurement. Further, changes in the electric conductivity or the pH value may also be detected.

Nuclear magnetic resonance (NMR) is a technique that has been used in a wide range of applications to study biomolecules. Conclusions regarding different aspects of biomolecules in a sample may be based on NMR signals of the biomolecules, e.g. proteins or peptides, themselves or on NMR signals derived from the solution comprising the biomolecule. E.g., Shigemitsu et al. (2016), Analytical Biochemistry 498:59-67) describe the measurement of NMR signals of amyloid beta peptide monomers and dimers. Metz and Mäder ((2008), International Journal of Pharmaceutics 364:170-175) show NMR experiments for the characterization of emulsions and lipid ingredients that may specifically be used in the pharmaceutical field, in particular, in drug delivery.

WO 2014/169229 A1 generally relates to a method of using NMR relaxation rates of water molecules as an indicator of the extent of aggregation of biopharmaceutical formulations. Similarly, WO 2018/102681 A1 describes a method of using the transverse relaxation rates of solvent NM R signal to noninvasively assess particle-containing products formulated as suspension or emulsion in solvent(s). In both cases, the biopharmaceutical compound can be evaluated nondestructively without the vial or container being opened or protective seal compromised (i.e., broken). Hills et al. (1989), Molecular Physics, 67(4):903-918) describe the transverse water proton relaxation in solutions of native bovine serum albumin (BSA). They present evidence that the transverse water proton relaxation is influenced by the fast exchange of protons between water and amino acid side chains of the protein. Feng et al. (2015), Chem. Commun. 51: 6804 describe that the transverse relaxation rate of water protons can be used to quantify protein aggregation and surfactant micellization in water. Using human insulin preparations, Taraban et al. (2015), Journal of Pharmaceutical Sciences 104:4132-4141) demonstrate that the transverse relaxation rate of water protons can serve as a reliable and sensitive indicator to detect and quantify both visible and sub-visible protein aggregates. Taraban et al. (2017), Analytical Chemistry 89:5494-5502) explore differences in the sensitivity of water NMR and conventional techniques, such as size-exclusion chromatography, microflow imaging and dynamic light scattering, toward detection of the presence of monoclonal antibody aggregates generated by different stresses. Taraban et al. (2019), Anal Chem 91(6):4107 disclose the use of water proton NMR for characterization of protein aggregates. Recently, it was found that in-line measurement of water NMR is possible, however, is dependent on flow system configuration, flow rate, protein concentration, and protein aggregation (Taraban et al. (2019), 7th Annual PANIC Conference, Poster presentation P35: "Water Flow-NMR—A Prospective Contact-Free In-Line Analytical Tool for Continuous Biomanufacturing").

WO 2012/015912 A1 relates to methods for purifying active polypeptides or immunoconjugates; WO 2019: 016154 A1 teaches techniques for the industrial-scale purification of proteins and other biomolecules.

Problem to be Solved

Nonetheless, there is still a need in the art for means and methods assisting in purification of biomolecules or complexes of biomolecules, in particular proteins or complexes thereof.

SUMMARY

This problem is addressed by a method, system, use, preparation, and computer program product with the features of the independent claims. Advantageous embodiments which might be realized in an isolated fashion or in any arbitrary combinations are listed in the dependent claims.

Thus, the present invention relates to a separation method comprising:

i) providing an aqueous solution comprising a target compound;

ii) applying a separation step to the aqueous solution, thereby providing a plurality of fractions of the aqueous solution;

iii) determining a concentration parameter indicating a concentration of the target compound in at least part of the fractions;

iv) determining a nuclear magnetic resonance (NMR) parameter by applying an NMR measurement to the fractions, the NMR parameter indicating a nuclear magnetic spin relaxation in said at least part of the fractions; and v) determining a target parameter of said at least part of the fractions based on the concentration parameter and the nuclear magnetic resonance parameter.

In general, terms used herein are to be given their ordinary and customary meaning to a person of ordinary skill in the art and, unless indicated otherwise, are not to be limited to a special or customized meaning. As used in the following, the terms "have". "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may refer both to a situation in which, besides B, no other element is present in A (i.e. a situation in which A solely and exclusively consists of B) and to a situation in which, besides B, one or more further elements are present in entity A, such as element C, elements C and D or even further elements. Also, as is understood by the skilled person, the terms "a" and "an" refer to "one or more", i.e. are equivalent to "at least one". Thus, e.g. the formulation "a separation method comprising: i) providing an aqueous solution comprising a target compound; ii) applying a separation step to the aqueous solution, thereby providing a plurality of fractions of the aqueous solution; iii) determining a concentration parameter indicating a concentration of the target compound in at least part of the fractions; iv) determining a nuclear magnetic resonance (NMR) parameter by applying an NMR measurement to the fractions, the NMR parameter indicating a nuclear magnetic spin relaxation in said at least part of the fractions; and v) determining a target parameter of said at least part of the fractions based on the concentration parameter and the nuclear magnetic resonance parameter" is equivalent to "a separation method comprising: i) providing at least one aqueous solution comprising at least one target compound; ii) applying at least one separation step to the aqueous solution, thereby providing a plurality of fractions of the aqueous solution: iii) determining at least one concentration parameter indicating a concentration of the target compound in at least part of the fractions; iv) determining at least one nuclear magnetic resonance (NMR) parameter by applying at least one NMR measurement to the fractions, the NMR parameter indicating at least one nuclear magnetic spin relaxation in said at least part of the fractions; and v) determining at least one target parameter of said at least part of the fractions based on the concentration parameter and the nuclear magnetic resonance parameter."

Further, as used in the following, the terms "preferably", "more preferably", "most preferably", "particularly", "more particularly", "specifically", "more specifically" or similar terms are used in conjunction with optional features, without restricting further possibilities. Thus, features introduced by these terms are optional features and are not intended to restrict the scope of the claims in any way. The invention may, as the skilled person will recognize, be performed by using alternative features. Similarly, features introduced by "in an embodiment" or similar expressions are intended to be optional features, without any restriction regarding further embodiments of the invention, without any restrictions regarding the scope of the invention and without any restriction regarding the possibility of combining the features introduced in such way with other optional or non-optional features of the invention.

As used herein, the term "standard conditions", if not otherwise noted, relates to IUPAC standard ambient temperature and pressure (SATP) conditions. i.e. preferably, a temperature of 25° C. and an absolute pressure of 100 kPa; also preferably, standard conditions include a pH of 7. Moreover, if not otherwise indicated, the term "about" relates to the indicated value with the commonly accepted technical precision in the relevant field, preferably relates to the indicated value±20%, more preferably ±10%, most preferably ±5%. Further, the term "essentially" indicates that deviations having influence on the indicated result or use are absent, i.e. potential deviations do not cause the indicated result to deviate by more than ±20%, more preferably ±10%, most preferably ±5%. Thus, "consisting essentially of" means including the components specified but excluding other components except for materials present as impurities, unavoidable materials present as a result of processes used to provide the components, and components added for a purpose other than achieving the technical effect of the invention. For example, a composition defined using the phrase "consisting essentially of" encompasses any known acceptable additive, excipient, diluent, carrier, and the like. Preferably, a composition consisting essentially of a set of components will comprise less than 5% by weight, more preferably less than 3% by weight, even more preferably less than 1%, most preferably less than 0.1% by weight of non-specified component(s).

The method of the present invention is an in vitro method. Moreover, it may comprise steps in addition to those explicitly mentioned above. For example, further steps may relate, e.g., to producing an aqueous solution comprising a target compound for step i), and/or the steps indicated elsewhere herein, e.g. combining two or more fractions identified to be fractions of interest, and/or further purification steps preceding and/or following the steps of the method as described herein. In particular, the method may be repeated applying at least one further, in an embodiment non-identical, separation step, in an embodiment based on a non-identical separation principle, to at least one fraction after step iv). Moreover, one or more of said steps may be performed by automated equipment.

In an embodiment, the steps of the method are performed in the order deemed appropriate by the skilled person. In a further embodiment, at least step i) is performed before step ii), and steps iii) and iv) are performed before step v). It is also envisaged that, in an embodiment, steps iii) to iv), or at least parts of steps ii) to v) are performed essentially simultaneously; thus. e.g. the outlet of a chromatography column may be connected to a concentration determining device and a NMR measurement device. In a further embodiment, the outlet may be connected to a liquid distribution element, such as a switching valve, which diverts the solution emerging from the column to a target compound collection device in case target parameter meets a threshold criterion, and diverts the solution emerging from the column to a waste collection device in case the threshold criterion is not met. In a further embodiment, the steps of the method are performed in the sequence as indicated.

The term "separation method", as used herein, relates to any method suitable for enrichment of a target compound over other compounds comprised in an aqueous solution; thus, in an embodiment, the separation method causes separation of a target compound from other compounds. In an embodiment, the separation method is a method of separating molecules having a different molecular mass from the target compound, in an embodiment, having a molecular mass of less than 75%, in an embodiment less than 50%, in a further embodiment less than 25%, in a further embodiment less than 10% of the target compound or having a molecular mass of at least 150%, in an embodiment at least 200%, in a further embodiment at least 250% of the target compound. In an embodiment, the separation method is a method of separating molecules having a different size and/or molecular mass, but otherwise similar physical, chemical and/or biochemical properties, from the target compound; thus, in an embodiment, the method is a method of separating aggregates, fragments, and/or degradation products of a target compound from the target compound. Thus, in case the target compound is a polypeptide, the separation method in an embodiment is a method of separating host cell proteins, aggregates, fragments, and/or degradation products from said polypeptide; in a further embodiment, in case the target compound is a polypeptide, the separation method in an embodiment is a method of separating aggregates, fragments, and/or degradation products from said polypeptide. In an embodiment, in case the target compound is a virus capsid, the separation method is a method of separating empty virus capsids from filled virus capsids, in an embodiment empty adeno-associated virus (AAV) capsids from filled AAV capsids.

The terms "empty capsid" and "empty particle", in an embodiment, refer to a viral particle that includes at least a viral protein shell but that lacks in whole or part a nucleic acid that encodes a protein or is transcribed into a transcript of interest. Accordingly, the empty capsid does not function to transfer a nucleic acid that encodes a protein or is transcribed into a transcript of interest into the host cell.

In certain embodiments, the NMR parameter is corrected for changes not caused by viral particles, in particular for solute effects, which may in certain embodiments be based on pH value and/or ion concentration. In certain embodiments, such correction is provided by performing a pre-run using an aqueous solution with known viral particle content and otherwise identical composition as the aqueous solution to be used and/or a pre-run using an aqueous solution not comprising viral particles and otherwise identical composition as the aqueous solution to be used.

Thus, in certain embodiments, the ratio/fraction/concentration of polynucleotide-loaded viral particles is directly proportional to the NMR parameter being the transverse relaxation time ($T_2$) of the protons of the water molecules in the aqueous solution.

A "recombinant viral vector", in an embodiment, is derived from the wild-type genome of a virus, such as AAV by using molecular methods to remove the wild type genome from the virus (e.g., AAV), and replacing it with a non-native nucleic acid, such as a nucleic acid transcribed into a transcript or that encodes a protein. Typically, for AAV one or both inverted terminal repeat (ITR) sequences of AAV genome are retained in the AAV vector. A "recombinant" AAV vector is distinguished from a naturally occurring viral AAV genome, since all or a part of the viral genome has been replaced with a non-native (i.e., heterologous) sequence with respect to the natural viral genomic nucleic acid. Incorporation of a non-native sequence therefore defines the viral vector (e.g., AAV) as a "recombinant" vector, which in the case of AAV can be referred to as a "rAAV vector."

A recombinant viral vector (e.g., AAV) polynucleotide, in an embodiment, can be packaged into a viral particle for subsequent infection (transduction) of a cell, ex vivo, in vitro or in vivo. Where a recombinant vector sequence is encapsulated or packaged into an AAV particle, the particle can also be referred to as an "AAV particle" or a "rAAV particle". Such particles include proteins that encapsulate or package the vector genome. Particular examples include viral envelope proteins, and in the case of AAV, capsid proteins, such as AAV VP1, VP2 and VP3.

A "vector", in an embodiment, refers to the portion of the recombinant polynucleotide ultimately packaged or encapsulated, either directly or in form of one or more single- or double-stranded DNA(s) or RNA(s), to form a viral (e.g., AAV) particle. In case recombinant plasmids are used to construct or manufacture recombinant viral particles, the viral particle does not include the portion of the "plasmid" that does not correspond to the vector sequence of the recombinant plasmid. This non-vector portion of the recombinant plasmid is referred to as the "plasmid backbone", which is important for cloning and amplification of the plasmid, a process that may be needed for propagation and recombinant virus production, but is not itself packaged or encapsulated into virus (e.g., AAV) particles. Thus, a "vector" refers to the nucleic acid that is packaged or encapsulated by a virus particle (e.g., AAV).

As is understood by the skilled person in view of the description herein, the separation method comprises at least a step of applying a separation step as specified herein to an aqueous solution comprising a target compound, thereby providing a plurality of fractions, and one or more steps providing information on the concentration and purity of the target compound in at least part of the fractions. Thus, in an embodiment, the method is a method of in-process control of the target compound in a separation step. In an embodiment, the separation method is part of a biochemical purification method and/or part of a method of production of a target compound, in particular a polypeptide or polypeptide complex. As will be understood by the skilled person, the biochemical purification method may consist of the separation method, or may comprise further purification steps, in an embodiment one or more further separation methods, in a further embodiment one or more further separation methods according to the present disclosure.

In an embodiment, the separation method comprises the step of applying a separation step as specified herein to an aqueous solution comprising a target compound, thereby providing a plurality of fractions, and a step of identifying at least one of said fractions comprising the target compound in an enriched and/or purified state. In an embodiment, the separation method comprises further steps in addition to steps i) to iv) specified above, including in an embodiment at least one of vi) identifying, based on the target parameter, fractions comprising the target compound, in an embodiment identifying, based on the target parameter, fractions comprising the target compound at a desired purity, and vii) combining at least two of the fractions comprising the target compound, in an embodiment combining, based on the target parameter, fractions comprising the target compound at a desired purity. In an embodiment, in step vii), fractions are combined for which the target parameter fulfills a target condition; thus, fractions comprising the target compound at a desired purity are, in an embodiment, identified based on the aforesaid target parameter.

In accordance with the above, the term "separation step" relates to a step including application of at least one separation principle to the aqueous solution and obtaining a plurality of fractions, causing distribution of constituents of the aqueous solution to differ over at least two of said fractions. The separation principle may be any principle causing distribution of constituents to differ over fractions from a separation step, in particular a physical principle (e.g. sedimentation velocity or molecule size), a chemical principle (e.g. solubility in the presence of salt, hydrophobicity, or charge), or biochemical principle (e.g. affinity to another molecule), or a combination thereof. In an embodiment, the separation step is a liquid chromatography (LC) step. LC methods are known to the skilled person and include in particular high performance liquid chromatography (HPLC), fast protein liquid chromatography (FPLC), and any other type of LC deemed appropriate by the skilled person. In an embodiment, the LC is a membrane and/or filter based LC. In a further embodiment, the LC is a column-based LC. In an embodiment, the LC is selected from the list consisting of size exclusion chromatography, ion exchange chromatography, hydrophobic interaction chromatography, affinity chromatography, chiral chromatography, phase separation chromatography, distribution chromatography, and mixed mode chromatography. In a further embodiment, the LC is size exclusion chromatography or ion exchange chromatography. In an embodiment, ion exchange chromatography is cation ion exchange chromatography or anion ion exchange chromatography. In an embodiment, the LC is mixed mode chromatography.

In an embodiment, the separation method is a biochemical separation method. As used herein, the term "biochemical" in the expression "biochemical separation method" relates to the fact that the target compound is a biochemical compound as specified elsewhere herein and is not intended to limit the separation method or separation step as such.

The term "aqueous solution" is, in principle, understood by the skilled person. As used herein, the term relates to any liquid preparation wherein the concentration of water in the solvent is at least 50%, in an embodiment at least 75%, in a further embodiment at least 90%, in a further embodiment at least 95%, in a further embodiment at least 98%, in a further embodiment at least 99%, in a further embodiment is about 100%, in a further embodiment is essentially 100%. Further, as used herein, the term "solution" indicates that at least a fraction of the compounds (solutes) in the solution is dissolved in the solvent. In an embodiment, the solutes are essentially dissolved in the solvent, in a further embodiment the solutes are dissolved in the solvent. Methods for preparing solutions are known in the art. Thus, the term aqueous solution, in an embodiment, relates to a liquid preparation comprising a target compound which is, at least partially, dissolved in a solvent comprising, in an embodiment consisting of, water.

The term "target compound", as used herein, relates to any composition of matter comprising at least one high-molecular mass organic chemical compound of interest, in an embodiment wherein a high-molecular mass chemical compound is a chemical compound with a molecular mass of at least 500 (corresponding to 500 atomic mass units, and to 500 Da; 1 Da corresponding to $1.66 \times 10^{-27}$ kg), in a further embodiment at least 1000, in a further embodiment at least 10000, in a further embodiment at least 100000. Thus, the term relates to a high-molecular mass organic chemical compound, to a complex comprising said high-molecular weight organic chemical compound, and to a conjugate of said high-molecular mass organic chemical compound or of said complex. In an embodiment, the high-molecular mass organic chemical compound is a macromolecule, in an embodiment a biological macromolecule, in an embodiment having a molecular mass of at least 500 (0.5 kDa), in a further embodiment at least 1000 (1 kDa), in a further embodiment at least 10000 (10 kDa), in a further embodiment at least 100000 (100 kDa). In case the high-molecular mass organic chemical compound is a polypeptide, the molecular mass may be of from 0.5 kDa to 500 kDa, in an embodiment of from 1 kDa to 400 kDa, in a further embodiment of from 5 kDa to 250 kDa. In an embodiment, the high-molecular mass organic chemical compound is a polypeptide or a polynucleotide, in particular DNA, RNA, or locked nucleic acid (LNA). In a further embodiment, the high-molecular mass organic chemical compound is a polypeptide. Thus, in an embodiment, the target compound is a polypeptide or a polynucleotide, in particular DNA, RNA, or LNA, a conjugate of a polypeptide or a polynucleotide, or a complex comprising a polypeptide and/or a polynucleotide, such as a virus, a virus-like particle (VLP), or a liposome. In an embodiment, the target compound is a virus or a VLP; in a further embodiment, the target compound is a non-enveloped virus or a VLP of a non-enveloped virus, in a further embodiment the target compound is an adeno-associated virus (AAV) or a VLP of an AAV, in an embodiment as specified herein above. In an embodiment, the AAV particle has a serotype selected from the group of AAV serotypes consisting of AAV1, AAV2, AAV3, AAV4, AAV5, AAV6, AAV7, AAV8, AAV9 and mixtures and/or chimeras thereof. In one embodiment, the AAV particle has a serotype selected from the group of AAV serotypes consisting of AAV2, AAV4, AAV6, AAV8 and AAV9. In a further embodiment, the AAV particle is of the AAV2 serotype, or the AAV6 serotype, or the AAV8 serotype.

In an embodiment, the target compound is an immunoconjugate comprising (i) an antibody that binds to PD-1 and (ii) a polypeptide that signals through IL-2Rβγ, in an embodiment wherein the polypeptide signaling through IL-2Rβγ is an IL-2 polypeptide or an IL-15 polypeptide; in an embodiment, the target compound is an immunoconjugate as specified in WO 2018/184964 A1, in a further embodiment is an immunoconjugate as specified in any one of embodiments 46 to 68 herein below.

In an embodiment, the target compound is a fusion protein comprising (i) an immunoglobulin molecule that is not capable of specific binding to an antigen and (ii) two mutant interleukin-2 (IL-2) molecules comprising an amino acid mutation that reduces affinity of the mutant IL-2 molecule to the intermediate affinity IL-2 receptor, as compared to a wild-type IL-2 molecule, wherein said mutant IL-2 molecules comprise the sequence of SEQ ID NO: 30. In a further embodiment, the target compound is a fusion protein comprising (i) an immunoglobulin molecule that is not capable of specific binding to an antigen and (ii) two mutant IL-2 molecules comprising the sequence of SEQ ID NO: 30. In an embodiment, the target compound is a fusion protein as specified in WO 2015/118016 A1 and/or in EP 3102595 B1, in a further embodiment, is the DP47GS IgG-(IL2)$_2$ or the DP47GS IgG-(IL-2 N88D)$_2$ immunoconjugate as specified in WO 2015/118016 A1 and/or in EP 3102595 B1. In an embodiment, the target compound is a fusion protein as specified in any one of embodiments 69 to 90 herein below.

In an embodiment, the target compound is a bispecific antibody, in an embodiment a bispecific antibody binding to CD3 and a second antigen, in a further embodiment binding to CD3 and CEA. In a further embodiment, the target compound is a bispecific antibody that comprises a first, a second and a third Fab molecule and a Fe domain composed of two subunits, in an embodiment wherein the Fe domain is an IgG Fe domain, specifically an IgG1 Fe domain, more specifically a human IgG1 Fc domain. In an embodiment, said target compound is a bispecific antibody wherein the first Fab molecule is fused at the C-terminus to the N-terminus of the second Fab molecule, the second Fab molecule is fused at the C-terminus to the N-terminus of one of the subunits of the Fe domain, and the third Fab molecule is fused at the C-terminus to the N-terminus of the other one of the subunits of the Fe domain, in an embodiment wherein the second Fab molecule binds to CD3 and the first and the third Fab molecule bind to a second antigen, in a further embodiment wherein the second antigen is CEA. In an embodiment, the target compound is a bispecific antibody as specified in any one of embodiments 91 to 99 herein below, in a further embodiment the target compound is cibisatamab (WHO Drug Information (International Nonproprietary Names for Pharmaceutical Substances), Recommended INN: List 80, 2018, vol. 32, no. 3, p. 438).

The term "complex", as used herein, relates to a non-covalent association of a high-molecular mass organic chemical compound as specified herein with at least one identical or non-identical chemical molecule. The further molecule comprised in the complex may be any chemical molecule, including in particular identical or further target compounds as specified herein. In an embodiment, non-high-molecular mass organic chemical compounds are comprised in the complex, in particular low-molecular mass (small molecule) pharmaceutical compounds. In an embodiment, the complex is stable under standard conditions, in a further embodiment, the complex is stable under the conditions of the separation step, the term "stable" relating to a loss of at most 25%, in an embodiment at most 10%, in a further embodiment at most 5% in a further embodiment at most 1%, of the complex per day under the aforesaid conditions. In an embodiment, the dissociation constant $K_d$ for the dissociation of the high-molecular mass organic chemical compound and at least one further molecule comprised in the complex is at most $10^{-6}$ M, in an embodiment at most $10^{-7}$ M, in a further embodiment at most $10^{-8}$ M, in a further embodiment at most $10^{-9}$ M, in a further embodiment at most $10^{-10}$ M, under the aforesaid conditions.

The term "conjugate", as used herein, relates to a covalent linkage of a high-molecular mass organic chemical compound as specified herein with at least one identical or non-identical chemical molecule. The further molecule comprised in the conjugate may be any chemical molecule, including in particular identical or further target compounds as specified herein. In an embodiment, at least one non-high-molecular mass organic chemical compound is comprised in the conjugate, in particular a low-molecular mass (small-molecule) pharmaceutical compound, a detectable label, and/or an affinity label, such as biotin. In a further embodiment, at least one further high-molecular mass organic chemical compound is comprised in the conjugate, in particular a polymer such as polyethyleneglycol (PEG), in an embodiment a biodegradable polymer known to the skilled person, an oligo- or polysaccharide, a polypeptide, and/or a polynucleotide. In case the high-molecular mass organic chemical compound is a polypeptide or complex comprising a polypeptide, the at least one further high-molecular mass organic chemical compound may in particular be a low-molecular mass (small-molecule) pharmaceutical compound, a polynucleotide, in particular a locked nucleic acid, an affinity label such as biotin, a glycosylation, or a PEGylation.

In an embodiment, the target compound is a compound which can also be detected in a cell of a living being or a compound intended for administration thereto; thus, in an embodiment, a target compound is a chemical compound produced by a living cell and/or modulating the biochemical composition of a living cell.

In an embodiment, the target compound is or comprises a polypeptide, in a further embodiment is a polypeptide. In an embodiment, the target compound is a therapeutic polypeptide, i.e. a polypeptide for administration to a living being to prevent, ameliorate, or cure a disease or adverse condition. In an embodiment, the target compound is a diagnostic polypeptide, i.e. a polypeptide for use in diagnosing a disease or adverse condition. In an embodiment, the polypeptide is an antibody like protein, in particular an antibody or fragment thereof, in an embodiment a therapeutic or diagnostic antibody. In an embodiment, the target compound is a polypeptide, in an embodiment a non-aggregated and/or non-degraded polypeptide, in a further embodiment a non-aggregated and/or non-degraded antibody like protein, in particular an antibody or fragment thereof. In an embodiment, the target compound comprises a polypeptide as specified herein, in a further embodiment consists of the polypeptide as specified herein. Thus, in an embodiment, the target compound is a conjugate of a polypeptide as specified herein, in particular of an antibody like protein, specifically an antibody or fragment thereof and/or a fusion polypeptide thereof.

As used herein, the term "antibody like protein" relates to any polypeptide comprising at least one subdomain of an antibody, in particular an IgG, or fragment thereof. Thus, in an embodiment, the antibody like protein comprises at least one of a $V_H$, $V_L$, $C_L$, $C_{H1}$, $C_{H2}$, and $C_{H3}$ domain, in an embodiment, an $F_v$, $F_{ab}$ and/or an $F_c$ domain, in a further embodiment an F, or FE, domain. The aforesaid domains are, in principle, known to the skilled person and are further described herein below. In an embodiment, the antibody like protein is a multispecific antibody like protein, i.e. comprises a multitude of $F_v$ and/or $F_{ab}$ domains, in a further embodiment, the antibody like protein is a bispecific antibody like protein, i.e. comprises two $F_v$ and/or $F_{ab}$ domains.

The term "antibody" is used herein in the broadest sense and in particular covers monoclonal antibodies, polyclonal antibodies, multispecific antibodies (e.g. bispecific antibodies) formed from at least two antibodies or fragments thereof, fusions polypeptides of two or more antibody domains, single-chain antibodies, single-domain-antibodies (VHH, also known as nanobodies), and antibody fragments, as well as compounds comprising at least one of the aforesaid compounds. In an embodiment, the antibody is or comprises a full-length antibody or an antibody fragment. In a further embodiment, the antibody is or comprises a fusion polypeptide of two or more antibody domains, in an embodiment from at least two non-identical antibodies. In an embodiment, the antibody is or comprises a monoclonal antibody. An antibody may be part of a larger fusion molecule, formed by covalent or non-covalent association of the antibody with one or more other proteins or peptides.

"Antibody fragments" comprise a portion of an intact antibody, in an embodiment, comprising the antigen-binding region thereof. Examples of antibody fragments include Fab, Fab', F(ab')2, and Fv fragments; diabodies; linear antibodies: single-chain antibody molecules; and multispecific antibodies formed from antibody fragments. Papain digestion of antibodies produces two identical antigen-binding fragments, called "Fab" fragments, each with a single antigen-binding site, and a residual "Fc" fragment, whose name reflects its ability to crystallize readily. Pepsin treatment yields an F(ab')2 fragment that has two antigen-combining sites and is still capable of cross-linking antigen. "Fv" is the minimum antibody fragment which contains a complete antigen-binding site. In an embodiment, a two-chain Fv species consists of a dimer of one heavy- and one light-chain variable domain in tight, non-covalent association. In a single-chain Fv (scFv) species, one heavy- and one light-chain variable domain can be covalently linked by a flexible peptide linker such that the light and heavy chains can associate in a "dimeric" structure analogous to that in a two-chain Fv species. The term "diabodies" refers to antibody fragments with two antigen-binding sites, which fragments comprise a heavy-chain variable domain (VH) connected to a light-chain variable domain (VL) in the same polypeptide chain (VH-VL). By using a linker that is too short to allow pairing between the two domains on the same chain, the domains are forced to pair with the complementary domains of another chain and create two antigen-binding sites. Diabodies may be bivalent or bispecific. The term "monoclonal antibody" as used herein refers to an antibody obtained from a population of essentially homogeneous antibodies. i.e., the individual antibodies comprising the population are identical except for possible mutations, e.g., naturally occurring mutations, that may be present in minor amounts. Thus, the modifier "monoclonal" indicates the character of the antibody as not being a mixture of discrete antibodies. In a further embodiment, the antibody may be, in an embodiment covalently, linked to a further chemical molecule. Methods how to covalently link a polypeptide with a chemical molecule are known in the art. Preferred chemical molecules for covalently linking with the binding polypeptide of the present invention are pharmaceutical compounds such as cytokines, metal-complex forming agents, and the like.

In an embodiment, the target compound is a conjugate comprising a polypeptide, in a further embodiment is a polypeptide conjugate. As used herein, the term "polypeptide conjugate" relates to a polypeptide comprising at least one covalent bond to an additional chemical group or molecule, wherein said chemical bond is not a peptide bond continuing the peptide chain of the polypeptide. In an embodiment, the additional chemical group or molecule is an "indicator", i.e. a compound adapted for making the presence of a molecule or complex comprising said indicator detectable. Typically, the indicator has a detectable property, typically an optical or/and enzymatic property. It is, however, also envisaged that said detectable property is the property of emitting radioactivity. The term "optical property", as used herein, relates to any property which can be detected by an optical instrument. Specifically, the optically determinable property may be or may comprise at least one property selected from the group consisting of: a reflection property, a transmission property, an emission property, a scattering property, a fluorescence property, a phosphorescence property, a diffraction property, and a polarization property. Further optical properties envisaged by the present invention are color, fluorescence, luminescence, or refraction. In an embodiment, an optically determinable property as referred to herein refers to a property of a chemical compound which can be optically detected such as light absorption, light emission, light remission, or properties associated therewith. It will be understood that detecting an optically determinable property as used herein encompasses the detection of the presence of a property which was not detectable before, the detection of the absence of a property which has been detected before, and the detection of quantitative changes of a property, i.e., the detection of the change of the signal strength which correlates to the extent of the change of the at least one optical property. It is understood that the term "optically determinable property", in an embodiment, also relates to electrochemiluminescence, which is also known as electrogenerated chemiluminescence. In a further embodiment, the additional chemical group or molecule is an "effector", i.e. a compound mediating an additional effect of the target compound, in particular an additional therapeutic effect. Thus, the effector may e.g. be a chemical structure being a cytotoxins, e.g. a chemotherapeutic compound, an immune stimulant, e.g. a cytokine, or a complex forming group, e.g. for complexing a radioactive isotope of an element.

In an embodiment, the target compound is a therapeutic polypeptide conjugate or a diagnostic polypeptide conjugate. In an embodiment, the polypeptide is a conjugate of an antibody like protein as specified herein above, in an embodiment of a diagnostic and/or therapeutic antibody. In an embodiment, the polypeptide is an antibody conjugate, in an embodiment a therapeutic or diagnostic antibody conjugate. In an embodiment, the target compound is a polypeptide conjugate, in an embodiment a non-aggregated and/or non-degraded polypeptide conjugate, in a further embodiment a non-aggregated and/or non-degraded antibody conjugate.

In an embodiment, the target compound is or comprises a polypeptide complex. Thus, in an embodiment, the target compound is a complex comprising a quaternary structure of identical or non-identical polypeptide subunits. In a further embodiment, the polypeptide complex is or comprises a virus capsid, in an embodiment a non-enveloped virus capsid. As used herein, the term "virus capsid" includes filled capsids comprising one or more polynucleotide(s), empty capsids devoid of polynucleotides, as well as pre- and intermediate forms thereof. In an embodiment, the polypeptide complex is a virus-like particle (VLP); in a further embodiment, the polypeptide complex is a filled virus capsid, in an embodiment comprising a recombinant polynucleotide, in a further embodiment comprising a therapeutic polynucleotide, in a further embodiment comprising a recombinant therapeutic polynucleotide, wherein said polynucleotide may in particular be a DNA, an RNA, or a locked nucleic acid (LNA). In an embodiment, the virus capsid is a capsid of a non-enveloped virus, in a further embodiment an adeno associated virus capsid, an adenovirus capsid, or a parvovirus capsid.

In a further embodiment, the target compound is a "fusion polypeptide", i.e. a polypeptide comprising at least one further peptide sequence covalently bonded to the polypeptide via a peptide bond and being a continuation of the amino acid sequence of the polypeptide. Thus, in an embodiment, the fusion polypeptide is encoded by a continuous open reading frame. The further peptide sequence may be an indicator as specified herein above; thus, in an embodiment, the further peptide is a peptide having an optically determinable property, in an embodiment a fluorescent protein. e.g. a green fluorescent protein (GFP), a yellow fluorescent protein (YFP), a blue fluorescent protein (BFP), or a red fluorescent protein (RFP); or having an enzymatic property, e.g. an oxidase or a luciferase. The further peptide may also be an effector as specified herein above, in an embodiment a cytokine.

In a further embodiment, the target compound is a conjugate as specified herein of a fusion polypeptide as specified herein, in particular a conjugate of an antibody like protein. In an embodiment, the target compound is one of the compounds as specified herein in the Examples, in particular is ALP1, ALP2, ALP3 or ALP4 as specified in the Examples.

In an embodiment, the target compound is not a liposome. In a further embodiment, the target compound is not an enveloped viral particle or VLP thereof. In a further embodiment, the target compound comprises lipids at a fraction of at most 25% (w/w), in an embodiment at most 10% (w/w), in a further embodiment at most 5% (w/w), in a further embodiment at most 1% (w/w).

The term "fraction" is understood by the skilled person to relate to a subportion of a composition of matter, in an embodiment the aqueous solution as specified herein, resulting from the application of a separation step to an aqueous solution which is, in an embodiment, known or suspected to comprise a constituent of the aqueous solution. The fraction of the present disclosure is aqueous as specified herein above for the term aqueous solution. In an embodiment, at least one of the fractions comprises the target compound. As specified herein above, in particular in case the plurality of fractions is a low number, in particular three or two, the fractions need not necessarily have the same volumes. The term "at least part of the fractions" is understood by the skilled person to relate to a number of at least one fraction of all fractions provided. In an embodiment, at least part of the fractions are fractions suspected. e.g. from previous instances of performing the method, to comprise the target compound. In an embodiment, at least pan of the fractions is at least two, in an embodiment at least 5, in a further embodiment at least 10 fractions. In a further embodiment, at least part of the fractions relates to at least 1%, in an embodiment at least 5%, in a further embodiment at least 10%, in a further embodiment at least 25%, in a further embodiment at least 50% of all fractions provided. In an embodiment, at least part of the fractions includes all fractions provided. As is further understood, in an embodiment, the concentration parameter and the NMR parameter are determined in the same fractions and both parameters are determined for each fraction in which a parameter is determined. It is, however, also envisaged that only one parameter is determined for some samples and the second parameter is only determined in case the first parameter determined for said sample fulfills a given threshold criterion. In an embodiment, the fraction as specified herein is a virtual fraction, i.e., generated by formally dividing an eluate of a separation step into subportions, which may have the same or different volumes, and detecting the aforesaid parameters. In a further embodiment, the fractions are physical fractions, which may have the same or different volumes, comprised in separate containers. In an embodiment, the concentration of the target compound in at least one fraction is at least 1 mg/mL, in an embodiment at least 5 mg/mL, in a further embodiment at least 10 mg/mL, in a further embodiment at least 20 mg/mL; also in an embodiment, in case the target compound is a virus, in particular an AAV, the total concentration of the viral particles is at least $1*10^{12}$ vg/mL (viral genomes or vectors per mL), in a further embodiment at least $5*10^{12}$ vg/mL, in further embodiment at least $1*10^{13}$ vg/mL, in further embodiment at least $2*10^{13}$ vg/mL in at least one fraction.

The term "plurality" is known to the skilled person to relate to a number of at least two. In an embodiment, at least three, in a further embodiment at least four, in a further embodiment at least five fractions are provided. It is, however, also envisaged that at least ten, in an embodiment at least twenty fractions are provided in step i) of the method.

The term "concentration parameter", as used herein, relates to any parameter correlating with the concentration of the target compound or correlating with the concentration of the class of compounds the target compound belongs to in a composition of matter. The parameter may be a semi-quantitative or quantitative parameter, in an embodiment is a quantitative parameter. Suitable assays to determine such parameters are known in the art. In an embodiment, the concentration parameter is a generic concentration parameter, i.e. a parameter correlating with the concentration of a chemical class of compounds having the same or similar properties relevant for the determination method applied; e.g. the absorption of a solution at 280 nm is known to the skilled person to correlate with the concentration of polypeptides. In a further embodiment, the concentration parameter is a specific concentration parameter, i.e. a parameter specifically correlating with the concentration of the target compound; a specific concentration parameter may, e.g. e.g. in case the target compound is a polypeptide or conjugate or complex thereof, be determined in an immunoassay, e.g. an ELISA. The concentration parameter may be determined in a direct assay, i.e. an assay determining directly a property of a target compound or a property of the chemical class of compounds the target compound belongs to, or in an indirect assay, i.e. an assay detecting a property of a target compound or a property of the chemical class of compounds the target compound belongs to, induced by a detection agent. Thus, in case the target compound is a polypeptide, the concentration parameter may be determined in a direct assay, i.e. an assay determining directly a property of a polypeptide, or in an indirect assay, i.e. an assay detecting a property of a polypeptide induced by a detection agent. Indirect protein assays include in particular a Lowry assay, a Bradford assay, a bicinchoninic acid (BCA) assay or any other method deemed appropriate by the skilled person. In an embodiment, the concentration parameter is determined in-line, in particular in the form of a flow-through measurement. Thus, in an embodiment, the concentration parameter is determined in a direct assay, in an embodiment a direct photometric assay. In an embodiment, the concentration parameter is the absorption, extinction, or fluorescence of a target compound in a solution. In an embodiment, the target compound is a polypeptide and the concentration parameter is the absorption at 280 nm, 235 nm, and/or 205 nm, in a further embodiment at 280 nm.

The term "nuclear magnetic resonance" (NMR) is understood by the skilled person. In accordance, the term "nuclear magnetic resonance parameter", abbreviated as "NMR parameter", relates, in principle, to any parameter which can be determined by applying a nuclear magnetic resonance measurement to a sample, in particular an aqueous solution or fraction as specified elsewhere herein, and indicating a nuclear magnetic spin relaxation. In an embodiment, the NMR parameter is a parameter derivable from water proton NMR ($^1H_2O$ NMR). In an embodiment, the NMR parameter comprises or is a relaxation time or a relaxation rate determined in an NMR measurement, in an embodiment comprises or is a relaxation time or a relaxation rate determined in an $^1H_2O$ NMR measurement. In a further embodiment, the NMR parameter comprises or is at least one of a transverse nuclear magnetic spin relaxation time $T_2$ and a transverse nuclear magnetic spin relaxation rate $R_2$, in a further embodiment, the NMR parameter is indicative of a transverse nuclear magnetic spin relaxation of water in the solution or fraction thereof, specifically of protons in water in solution or fraction thereof. As the skilled person understands, relaxation time T is the reciprocal of the corresponding relaxation rate R, i.e. T=1/R. In an embodiment, the NMR parameter is a transverse relaxation time ($T_2$) or a transverse relaxation rate ($R_2$) determined in an NMR measurement, in an embodiment is a transverse relaxation time ($T_2$) or a transverse relaxation rate ($R_2$) determined in an $^1H_2O$ NMR measurement, i.e., in an embodiment, is a water proton transverse relaxation time ($T_2$) or a water proton transverse relaxation rate ($R_2$). In an embodiment, the magnetic field strength during determination is of from 0.1 T to 24 T, in an embodiment of from 0.2 T to 10 T, in an embodiment of from 0.3 T to 5 T, in a further embodiment of from 0.4 T to 2 T, in a further embodiment is about 0.5 T, in a further embodiment is 0.5 T. In an embodiment, the resonance frequency is of from 5 MHz to 500 MHz, in an embodiment of from 7.5 MHz to 200 MHz, in an embodiment of from 10 MHz to 100 MHz, in a further embodiment of from 15 MHz to 50 MHz, in a further embodiment is about 20 MHz, in a further embodiment is 20 MHz.

In an embodiment, the concentration parameter and the NMR parameter are non-identical; thus, in an embodiment, the concentration parameter is not a water proton transverse relaxation time $T_2$ and/or is not a water proton transverse relaxation rate $R_2$; in a further embodiment, the concentration parameter is not an NMR parameter indicative of a transverse nuclear magnetic spin relaxation of water as specified herein above.

The terms "applying a measurement" and "determining" are understood by the skilled person to relate to determining a value of a relevant parameter, in particular a concentration parameter and/or an NMR parameter. Thus, further parameters may additionally be determined, such as one or more further parameters of target compound concentration, temperature. pH, ion concentration, and the like. Methods for determining pH (e.g. via a proton-selective electrode) and ion concentration (e.g. by measuring conductivity) are known to the skilled person. In an embodiment, the determination is an off-line determination; thus, in an embodiment, fractions or subportions thereof are transferred to a measurement device. In case the determination is performed in an indirect assay, a subportion of the sample may be pretreated with one or more detection reagent(s) before measurement. In a further embodiment, the determination is in-line, i.e. does not require removal of a fraction or a subportion thereof from the process. In a further embodiment, the determination is a continuous in-line determination; thus, in an embodiment, the fractions are virtual fractions as specified herein above. Thus, in an embodiment, the fractions are generated as a continuous stream of liquid; in a further embodiment, steps iii) and iv) are performed continuously on a continuous stream of liquid, e.g. of eluate. In an embodiment, the concentration parameter, the NMR parameter and/or any other parameters(s) optionally determined is/are determined in a flow-through cell, in particular, in case of the concentration parameter, in a flow-through cuvette. The parameters may be determined simultaneously or sequentially, in an embodiment are determined sequentially. As discussed before, each parameter is, in an embodiment, determined in accordance with the present invention quantitatively or semi-quantitatively.

The term "target parameter", as used herein, relates to a parameter determined from the concentration parameter and the NMR parameter by at least one mathematical and/or logical operation. In an embodiment, the target parameter is a binary parameter, i.e. assumes one of two possible values, like 0 or 1, or yes or no; in a further embodiment, the target parameter is a numerical parameter based on numerical values of the concentration parameter and the NMR parameter.

In an embodiment, the target parameter is a binary parameter. In an embodiment, the value of the target parameter is determined by determining whether the concentration parameter meets a given threshold criterion, e.g. exceeds a given lower optical absorption or concentration value; and determining whether the NMR parameter meets a given threshold criterion, e.g. exceeds a given lower $T_2$ value; and by using the first binary value for all cases where at least one of the concentration parameter and the NMR parameter does not meet its threshold criterion, and the second binary value for the case where both the concentration parameter and the NMR parameter meet their respective threshold criteria; thus, in such case, the target parameter may be set to pool=no for fractions in which at least one of the concentration parameter and the NMR parameter does not meet its threshold criterion, and may be set to pool=yes for fractions in which both the concentration parameter and the NMR parameter meet their respective threshold criteria.

In a further embodiment, the target parameter is a numerical parameter calculated based on values of the concentration parameter and the NMR parameter. In principle, the target parameter may be calculated by any mathematical method ensuring that the result of the calculation is determinably different in case the concentration of the target compound is high, as determined by the concentration parameter, and the concentration of unwanted by-products is low, as determined by the NMR parameter. In an embodiment, the concentration parameter is or is mathematically transformed to be directly proportional to the concentration of the target compound; and the NMR parameter is or is mathematically transformed to be indirectly proportional to the concentration of unwanted by-products. Thus, in an embodiment, e.g. in case the target compound is a polypeptide and the unwanted by-product is an aggregate thereof, the concentration parameter is an absorption, e.g. at 280 nm, and the NMR parameter is a water proton NMR $T_2$ value as specified herein above. In such case, the target parameter is, in an embodiment, calculated as the product of the concentration parameter and the NMR parameter. As the skilled person understands, further calculations and additional parameters, e.g. scaling factors, may be used in the calculation of the target parameter as deemed appropriate by the skilled person. In particular, in an embodiment, the concentration parameter and/or the NMR parameter are normalized to be a value between 0 and 1, e.g. by normalizing all values determined to the highest value determined in all fractions. As the skilled person understands, the concentration parameter and/or the NMR parameter may also be non-normalized, in particular in applications using live monitoring of fractions. Furthermore, in an embodiment, the concentration parameter is corrected for changes not caused by the concentration of the target compound, e.g. buffer effects, and/or the NMR parameter is corrected for changes not caused by unwanted by-products, in particular for buffer effects, which may in an embodiment be caused by a change in pH and/or a change in ion concentration. In an embodiment, such correction is provided by performing a parallel or prerun in the absence of the target compound or even in the absence of the aqueous solution. In an embodiment, such correction is performed as shown herein in the Examples. Thus, in an embodiment, the target parameter is calculated as the product of the concentration parameter and the NMR parameter, wherein the product value may optionally be normalized; in a further embodiment, the target parameter is calculated as the product of the normalized concentration parameter and the normalized NMR parameter. In a further embodiment, the target parameter is calculated as the product of the, optionally normalized, concentration parameter and the, optionally normalized, NMR parameter corrected for salt and/or pH effects. Thus, in an embodiment, the target parameter is directly proportional to the concentration parameter and to the NMR parameter being the transverse relaxation time ($T_2$), in an embodiment is directly proportional to the product of the concentration parameter and the NMR parameter being the transverse relaxation time ($T_2$).

In an embodiment, the method comprises the further step of comparing the target parameter with a threshold value. The term "threshold value" is understood by the skilled person and the skilled person is, in view of the teaching of the present description, able to establish a suitable threshold value. The value of the threshold will depend on the specific formula used for calculating the target parameter and will in an embodiment be adjusted by the skilled person to achieve the required yield and/or purity of the target compound. Thus, for a given target compound, experimental determination of a suitable threshold value may be required.

In an embodiment, the method comprises the further step of vi) identifying, based on the target parameter, fractions comprising the target compound, in an embodiment identifying, based on the target parameter, fractions comprising the target compound at a desired purity. In an embodiment, said identifying comprises determining whether the digital target parameter is indicative that the respective sample has the desired purity; or comprises determining for each sample under investigation whether the value of the target parameter determined is indicative of a fraction comprising the target compound at a desired purity. As is understood from the above, this is, in an embodiment, accomplished by comparing the value of the target parameter determined for a fraction to a threshold value. In an embodiment, a fraction is identified as comprising the target compound at a desired purity in case the value of the target parameter is at least equal to the threshold value.

The term "purity" is used herein in its conventional meaning as a measure for the absence of non-target compound components in a preparation, solution, or fraction. In an embodiment, purity is at least 50% purity, in an embodiment at least 75% purity, in an embodiment at least 90% purity, in an embodiment at least 95% purity, in a further embodiment at least 98% purity, in a further embodiment at least 99% purity. In an embodiment, the term purity, as used herein, relates to absolute purity, i.e. is a measure of the absence of any non-target compound components, in an embodiment except a solvent; in a further embodiment, the term purity may also relate to relative purity, i.e. to the absence of specific non-target compound components. I.e., in an embodiment, purity of a target compound being a polypeptide may be indicated as a measure of absence of other polypeptides, in an embodiment of other polypeptides fulfilling specific size and/or mass criteria. Also in an embodiment, the term purity is used as a measure for the absence of target compounds being similar, but not identical, to the target compound, e.g., in case the target compound is a polypeptide, host cell proteins, aggregates, fragments, and/or degradation products of said polypeptide; in a further embodiment, aggregates, fragments, and/or degradation products of said polypeptide.

In a further embodiment, the method further comprises a step of vii) combining at least two of the fractions comprising the target compound, in an embodiment combining, based on the target parameter, fractions comprising the target compound at a desired purity. In an embodiment, at least two, in a further embodiment at least three, fractions are combined. In a further embodiment, all fractions determined to comprise the target compound at a desired purity are combined; in a further embodiment, all fractions meeting a given target condition, e.g. at least equaling a threshold value as specified elsewhere herein, are combined. As will be understood, combining may also comprise establishing separate pools of non-identical purity, e.g. one pool of substantially pure target compound and a less pure second pool. In an embodiment, the method comprises at least one of automatically distributing, assigning, or combining two or more of the fractions on the basis of the target parameter. In particular, in an embodiment, an automatically controlled liquid distribution element is used which is controlled on the basis of the target parameter, specifically an automatic valve.

Advantageously, it was found in the work underlying the present invention that a combination of concentration measurement and NMR measurement can be used to assist in purification of compounds, in particular in removal of compounds having similar properties as the target compound, such as aggregates and the like. Also advantageously, it has been found that the fraction/percentage/concentration of DNA-loaded AAV particles correlates to the transverse nuclear magnetic spin relaxation time $T_2$ in an aqueous solution comprising DNA-loaded and empty AAV particles by water proton NMR ($^1H_2O$ NMR) and that this correlation, in combination with measurement of protein concentration, can be used in detection of separation of empty capsids from filled capsids.

The definitions made above apply mutatis mutandis to the following. Additional definitions and explanations made further below also apply for all embodiments described in this specification mutatis mutandis.

The present invention also relates to a use of the method as specified herein above for a purpose selected from the group consisting of producing an AAV particle, purifying an AAV particle, and removing impurities from a preparation of an AAV particle.

The present invention also relates to a preparation of a target compound produced or producible according to the method of the present invention.

The present invention further relates to a separation system, comprising:
a) a separation device configured for applying a separation step to an aqueous solution comprising a target compound, thereby providing a plurality of fractions of the aqueous solution;
b) a concentration determining device configured for determining a concentration parameter indicating a concentration of the target compound in at least part of the fractions;
c) a nuclear magnetic resonance (NMR) measurement device configured for determining an NMR parameter by applying an NMR measurement to the fractions, the nuclear magnetic resonance parameter indicating a nuclear magnetic spin relaxation in said at least part of the fractions; and
d) an evaluation device configured for determining a target parameter of said at least part of the fractions based on the concentration parameter and the NMR parameter.

The term "system", as used herein, relates to a collection of the indicated means which are operatively linked to each other. Said means may be implemented in a single system or may be physically separated devices which are operatively linked to each other. In an embodiment, the system is adapted to perform a separation step as specified herein above to an aqueous solution, to provide a plurality of fractions, to determine a concentration parameter, to determine an NMR parameter, and to determine a target parameter in at least part of the fractions. In an embodiment, the system further comprises an output device outputting the result of the determination performed by the evaluation device, in an embodiment in an ordered output assigning at least a target parameter to at least part of the fractions. In an embodiment, the system is further adapted to provide a preparation of pooled fractions fulfilling pre-specified target criteria, in particular at least having a target parameter at least equaling a pre-defined threshold value. In an embodiment, the system further comprises a liquid distribution element, in an embodiment a pooling device or a distribution device. Thus, in an embodiment, the system further comprises a pooling device for combining at least two of the fractions comprising the target compound and/or an output device outputting the values of the target parameter determined in step d). In a further embodiment, the system comprises a distribution device configured to distribute fractions into separate containers. In an embodiment, the system further comprises a data storage device configured for storing, in particular in electronic form, data provided by the devices of the system, data provided by user input, in particular one or more threshold values, and/or instructions for performing the analysis, in particular machine-readable instructions for performing the algorithms as specified herein above. As is understood by the skilled person, said data storage device(s) may be part of the separation device, the concentration determining device, and/or the NMR measurement device, and/or may be standalone data storage device(s) operatively linked to the other devices of the system.

The term "separation device", as used herein, relates to any device configured for applying a separation step to an aqueous solution, thereby providing a plurality of fractions of the aqueous solution. Suitable separation steps have been described herein above; accordingly, suitable separation devices comprise in particular chromatography columns comprising an appropriate solid phase. As will be understood by the skilled person, the separation device may comprise further devices usual in the art, in an embodiment one or more pumps, connection tubing, sample application instrumentation, heating and/or cooling units, pressure sensors, and the like.

The term "concentration determining device", as used herein, includes any and all devices configured for determining a concentration parameter as specified herein above. As will be understood from the above, the specific method of determining a concentration of a target compound will in particular depend on the chemical nature of the target compound. In an embodiment, the concentration determining device is configured for in-line measurement, in a further embodiment for continuous in-line measurement. Thus, in an embodiment, the concentration determining device comprises a flow-through measurement cell. In an embodiment, the concentration is determined photometrically and the concentration determining device comprises a photocell and a light source. In an embodiment, the concentration determining device is a photometer, in an embodiment configured for measurement at 280 nm. Suitable devices are known in the art.

The terms "nuclear magnetic resonance measurement device" and "NMR measurement device", as used herein, equally include any and all devices configured for determining an NMR parameter by applying an NMR measurement to an aqueous solution or a fraction. In an embodiment, the NMR measurement device is configured to perform measurement of a nuclear magnetic spin relaxation value, in an embodiment a water proton nuclear magnetic spin relaxation value, in at least part of the fractions. In an embodiment, the NMR measurement device is configured for in-line measurement, in a further embodiment for continuous in-line measurement. Suitable devices are known in the art, e.g. from Metz & Mäder (2008), Int J Pharmaceutics 364:170 and from Taraban et al. (2017). Anal Chem 89:5494, and Taraban et al. (2019), 7th Annual PANIC Conference, Poster presentation P35: "Water Flow-NMR—A Prospective Contact-Free In-Line Analytical Tool for Continuous Biomanufacturing".

As used herein, the term "evaluation device" relates to a device applying at least one of the algorithms as specified herein to the concentration parameter determined by the concentration determining device and the NMR parameter determined by the NMR measurement device. Thus, in an embodiment, the evaluation device is adapted to determine a target parameter for at least one fraction. In a further embodiment, the evaluation device further is configured to compare the target parameter to a threshold value as specified herein above. In an embodiment, the evaluation device is adapted to perform all calculations and evaluations required to print out a value of a target parameter of at least one fraction and/or the result of a comparison of said value of a target parameter to a threshold value. In an embodiment, the evaluation device comprises a data processing device, preferably a microprocessor.

The present invention also relates to a use of a system according to the present invention and/or of the method according to the present invention, for a purpose selected from the group consisting of: producing a target compound, purifying a target compound, and removing impurities from a preparation of a target compound.

As used herein, the term "impurities" relates to all compounds decreasing purity of a target compound as specified herein above. Thus, impurities, in an embodiment, are product-specific by-products, host cell protein by-products, target compounds comprising undesired and/or lacking desired chemical modifications such as non-conjugated compounds (e.g. antibodies lacking LNA-conjugation), and/or physically modified target compound, such as aggregates and other derivatives as specified herein above.

The present invention further relates to a use of a concentration determining device and/or a nuclear magnetic resonance measurement device for separating a target compound in an aqueous solution according to the method according to the present invention.

The present invention also relates to a computer program product comprising instructions which, when executed on a suitable system comprising a computer, a concentration determining device, and a nuclear magnetic resonance (NMR) measurement device, cause at least the following steps to be performed I) determining a concentration parameter indicating a concentration of a target compound in at least one fraction of an aqueous solution comprising a target compound;

II) determining a nuclear magnetic resonance parameter by applying an NMR measurement to said at least one fraction, the NMR parameter indicating a nuclear magnetic spin relaxation in said at least one fraction; and III) determining a target parameter of said at least one fraction based on the concentration parameter and the NMR parameter.

Further disclosed and proposed herein is a computer program including computer-executable instructions for performing the method according to the present invention in one or more of the embodiments enclosed herein when the program is executed on a computer or computer network. Specifically, the computer program may be stored on a computer-readable data carrier. Thus, specifically, one, more than one or even all of method steps I) to III) as indicated above may be performed by using a computer or a computer network, preferably by using a computer program.

Further disclosed and proposed herein is a computer program product having program code means, in order to perform the method according to the present invention in one or more of the embodiments enclosed herein when the program is executed on a computer or computer network. Specifically, the program code means may be stored on a computer-readable data carrier.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Finally, disclosed and proposed herein is a modulated data signal which contains instructions readable by a computer system or computer network, for performing the method according to one or more of the embodiments disclosed herein.

Referring to the computer-implemented aspects of the invention, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, further disclosed herein are:
a computer or computer network comprising at least one processor, wherein the processor is adapted to perform the method according to one of the embodiments described in this description,
a computer loadable data structure that is adapted to perform the method according to one of the embodiments described in this description while the data structure is being executed on a computer,
a computer program, wherein the computer program is adapted to perform the method according to one of the embodiments described in this description while the program is being executed on a computer,
a computer program comprising program means for performing the method according to one of the embodiments described in this description while the computer program is being executed on a computer or on a computer network,
a computer program comprising program means according to the preceding embodiment, wherein the program means are stored on a storage medium readable to a computer,
a storage medium, wherein a data structure is stored on the storage medium and wherein the data structure is adapted to perform the method according to one of the embodiments described in this description after having been loaded into a main and/or working storage of a computer or of a computer network, and
a computer program product having program code means, wherein the program code means can be stored or are stored on a storage medium, for performing the method according to one of the embodiments described in this description, if the program code means are executed on a computer or on a computer network.

The present invention also relates to a database, in an embodiment tangibly embedded on a data carrier, comprising fraction numbers allocated to corresponding concentration parameter values, NMR parameter values, and/or target parameter values pre-established according to the separation method described herein. The present invention also relates to a system, in an embodiment as specified herein above, comprising the aforesaid database, wherein said system is, in an embodiment, adapted to obtain at least one of a concentration parameter value, an NMR parameter value, and a target parameter value from said database.

As will be understood by the skilled person, the database may be established by performing a separation method as specified herein and storing fraction numbers together with corresponding values of the indicated parameter(s). Thus, if the separation method is repeated under the same or essentially the same conditions, it may not be necessary to determine all three parameters as specified in the method and it may be possible to read one or more of said parameters from the database. Thus, in principle, in case the separation method is repeated under the same or essentially the same conditions, it may be possible to read the target parameter from the database without determining the concentration parameter and/or the NMR parameter, or to read the concentration parameter and/or the NMR parameter from the database. In an embodiment, at least one of the concentration parameter and the NMR parameter, in an embodiment the concentration parameter, is determined in order to ensure that the separation in the separation method indeed is the same.

The present invention also relates to a method for increasing concentration of a target compound in a solution by diafiltration, comprising
A) determining a first gradient of a nuclear magnetic resonance parameter (NMR parameter) over time in said solution or in a fraction thereof,
B) determining a second gradient of said NMR parameter over time in said solution or in a fraction thereof, and
C) at least temporarily decreasing diafiltration rate and/or increasing stirring rate in case the value of said second gradient of said NMR parameter deviates at least 10%, in an embodiment at least 20%, in a further embodiment at least 30%, from the value of said first gradient of said NMR parameter.

The method for increasing concentration of a target compound is an in vitro method and may comprise steps in addition to those specifically indicated.

The term "increasing concentration of a target compound in a solution" is used in its usual meaning and relates to any proceeding causing the concentration of a target compound to be higher after the proceeding compared to the concentration before start of the proceeding. In an embodiment, the concentration increase is in the range of from 1.25 fold to 250 fold, in an embodiment of from 1.5 fold to 125 fold, in a further embodiment of rom 2 fold to 50 fold. In an embodiment, the target compound is a polypeptide and the starting concentration is at least 0.5 mg/ml, in an embodiment at least 1 mg/ml, in a further embodiment at least 2 mg/ml, in a further embodiment at least 5 mg/ml.

The term "diafiltration" is known to the skilled person. In an embodiment, diafiltration is ultrafiltration, in particular in case the target compound is a polypeptide, in a further embodiment is tangential flow ultrafiltration. The term "diafiltration rate" is also understood by the skilled person to relate to the rate at which the filtrate is forced over the filter membrane, or the rate of permeate production, i.e. in an embodiment, the volume of permeate produced per time unit. In accordance, the term "decreasing diafiltration rate", as used herein, includes any and all measure causing the diafiltration rate to decrease, in an embodiment to become essentially 0, in a further embodiment to become 0. Such measure may, e.g. be decreasing pressure on the retentate side of the filtration membrane and/or increasing pressure on the permeate side of the filtration membrane. In an embodiment, at least temporarily decreasing diafiltration rate comprises stopping diafiltration for at least 5 min, in an embodiment for at least 15 min. The term "increasing stirring rate", as used herein, includes all measures increasing flow of solution parallel to the filtration membrane at the retentate side and/or increasing redistribution of target compound within the retentate.

As used herein, the term "gradient of an NMR parameter over time" relates to a change of said NMR parameter in the solution over time. In an embodiment, the NMR parameter is an NMR spin relaxation parameter, in an embodiment a water proton NMR parameter as specified herein above. Thus, in an embodiment, the NMR parameter is a transverse relaxation time ($T_2$) or a transverse relaxation rate ($R_2$) determined in an NMR measurement, in an embodiment is a transverse relaxation time ($T_2$) or a transverse relaxation rate ($R_2$) determined in an $^1H_2O$ NMR measurement, i.e., in an embodiment, is a water proton transverse relaxation time ($T_2$) or a water proton transverse relaxation rate ($R_2$).

According to the method for increasing concentration of a target compound, at least two gradients of an NMR parameter are determined. As will be understood by the skilled person, said first and second gradient are, in an embodiment, established by determining the same NMR parameter or by determining two NMR parameters which can be mathematically interconverted for comparison. As will also be understood, the time period of determining the gradients need not be identical for the first and second gradient; nonetheless, in an embodiment, the time period of determining the first gradient of said NMR parameter is essentially identical to the time period of determining the second gradient of said NMR parameter and, in an embodiment, is at most 5 min an embodiment at most 2 min. in a further embodiment at most 1 min. In an embodiment, the gradient of said NMR parameter is determined repeatedly, and the most recently determined gradient of said NMR parameter is the second gradient of said NM R parameter, and in an embodiment the second to last determined gradient of said NMR parameter is the first gradient of said NMR parameter. In an embodiment, the first and second gradient are determined in close timely succession, in an embodiment, the time period for determining the second gradient of said NMR parameter immediately follows the time period for determining the first gradient of said NMR parameter. Thus, in an embodiment, a gradient of said NMR parameter is determined continuously or semi-continuously.

Advantageously, it was found in the work underlying the present invention that aggregation of polypeptide in diafiltration processes may be detected very early via measurement of the indicated NMR parameter. Surprisingly, it was found that starting aggregation can be detected by a rather sudden change in the NMR parameter.

Summarizing and without excluding further possible embodiments, the following embodiments may be envisaged:

Embodiment 1. A separation method comprising:
i) providing an aqueous solution comprising a target compound;
ii) applying a separation step to the aqueous solution, thereby providing a plurality of fractions of the aqueous solution;
iii) determining a concentration parameter indicating a concentration of the target compound in at least part of the fractions;
iv) determining a nuclear magnetic resonance (NMR) parameter by applying an NMR measurement to the fractions, the NMR parameter indicating a nuclear magnetic spin relaxation in said at least part of the fractions; and
v) determining a target parameter of said at least part of the fractions based on the concentration parameter and the NMR parameter.

Embodiment 2. The method according to the preceding embodiment, wherein the target parameter is directly proportional to the concentration parameter and to the NMR parameter being the transverse relaxation time ($T_2$), in an embodiment is directly proportional to the product of the concentration parameter and the NMR parameter being the transverse relaxation time ($T_2$).

Embodiment 3. The method according to any one of the preceding embodiments, wherein the concentration parameter and the NMR parameter are normalized.

Embodiment 4. The method according to any one of the preceding embodiments, wherein the target parameter is compared with a threshold value.

Embodiment 5. The method according to any of the preceding embodiments, further comprising: vi) identifying, based on the target parameter, fractions comprising the target compound, in an embodiment identifying, based on the target parameter, fractions comprising the target compound at a desired purity.

Embodiment 6. The method according to any one of the preceding embodiments, wherein said purity is a degree of absence of aggregates and/or of degradation products of said target compound.

Embodiment 7. The method according to the preceding two embodiments, further comprising: vii) combining at least two of the fractions comprising the target compound, in an embodiment combining, based on the target parameter, fractions comprising the target compound at a desired purity.

Embodiment 8. The method according to the preceding embodiment, wherein, in step vii), fractions are combined for which the target parameter fulfills a target condition.

Embodiment 9. The method according to the preceding embodiment, wherein, in step vii), fractions are combined for which the target parameter exceeds the threshold value or fractions for which the target parameter at least equals the threshold value.

Embodiment 10. The method according to any one of the five preceding embodiments, wherein one or both of the concentration parameter and the nuclear magnetic resonance parameter additionally are subjected to a precondition, wherein combining of the fractions comprising the target compound is performed depending on the fulfillment of the precondition.

Embodiment 11. The method according to the preceding embodiment, wherein the precondition comprises the normalized nuclear magnetic resonance parameter being smaller than the concentration parameter or at least equal to the concentration parameter.

Embodiment 12. The method according to any one of the preceding embodiments, wherein the method comprises at least one of automatically distributing, assigning or combining two or more of the fractions on the basis of the target parameter.

Embodiment 13. The method according to the preceding embodiment, wherein an automatically controlled liquid distribution element is used which is controlled on the basis of the target parameter, specifically an automatic valve.

Embodiment 14. The method according to any one of the preceding embodiments, wherein at least part of the fractions provided in step ii) have differing chemical properties, in an embodiment differing pH values and/or salt concentrations, and wherein step iv) comprises correcting the NMR parameter for the differing chemical properties, specifically by correcting for a background caused by the differing chemical properties.

Embodiment 15. The method according to the preceding embodiment, wherein the method comprises a measurement of background NMR parameters measured for fractions having the differing chemical properties without containing the target compound.

Embodiment 16. The method according to any one of the preceding embodiments, wherein the NMR parameter comprises at least one of a transverse nuclear magnetic spin relaxation time $T_2$ and a transverse nuclear magnetic spin relaxation rate $R_2$.

Embodiment 17. The method according to any one of the preceding embodiments, wherein the NMR parameter is indicative of a transverse nuclear magnetic spin relaxation of water in the solution or fraction thereof, specifically of protons in water in solution or fraction thereof.

Embodiment 18. The method according to any one of the preceding embodiments, wherein step iii) comprises applying an optical measurement to the product sample, specifically at least one of an optical absorption measurement and an optical transmission measurement, more specifically one or more of an ultraviolet absorption measurement and an ultraviolet transmission measurement.

Embodiment 19. The method according to any one of the preceding embodiments, wherein the separation step in step ii) comprises a chromatographic separation, in an embodiment size-exclusion chromatography or ion exchange chromatography, wherein the fractions are fractions of an eluate of the chromatographic separation.

Embodiment 20. The method according to any one of the preceding embodiments, wherein the fractions have differing pH values and/or differing ion concentrations.

Embodiment 21. The method according to any one of the preceding embodiments, wherein the method is a continuous in-line method.

Embodiment 22. The method according to any one of the preceding embodiments, wherein, in step ii), the fractions are generated as a continuous stream of liquid.

Embodiment 23. The method according to the preceding embodiment, wherein steps iii) and iv) are performed continuously on the continuous stream of liquid.

Embodiment 24. The method according to any one of the preceding embodiments, wherein the target compound comprises, in an embodiment is, a compound selected from the group consisting of (i) a polypeptide, (ii) a polynucleotide, (iii) a complex of one of (i) or (ii); and (iv) a conjugate of one of (i) to (iii); in an embodiment is a virus capsid or a polypeptide, in a further embodiment is a non-aggregated polypeptide.

Embodiment 25. The method according to any one of the preceding embodiments, wherein the target compound comprises, in an embodiment is, at least one of: a monomer of a polypeptide; an oligomer of a polypeptide, an aggregate of a polypeptide; an agglomerate of a polypeptide; a polymer of a polypeptide; a fragment of a polypeptide, in an embodiment is a monomer or an oligomer of a polypeptide.

Embodiment 26. The method according to any one of the two preceding embodiments, wherein the concentration of said target compound is at least 1 mg/mL, in an embodiment at least 5 mg/mL, in a further embodiment at least 10 mg/mL, in a further embodiment at least 20 mg/mL.

Embodiment 27. A separation system, comprising:
  a) a separation device configured for applying a separation step to an aqueous solution comprising a target compound, thereby providing a plurality of fractions of the aqueous solution;
  b) a concentration determining device configured for determining a concentration parameter indicating a concentration of the target compound in at least part of the fractions;
  c) a nuclear magnetic resonance (NMR) measurement device configured for determining an NMR parameter by applying an NMR measurement to the fractions, the nuclear magnetic resonance parameter indicating a nuclear magnetic spin relaxation, in an embodiment an NMR spin relaxation of water, in said at least part of the fractions; and
  d) an evaluation device configured for determining a target parameter of said at least part of the fractions based on the concentration parameter and the NMR parameter.

Embodiment 28. The system according to the preceding embodiment, the system being configured for performing the method according to any one of the preceding embodiments referring to a method.

Embodiment 29. The system according to the preceding two embodiments, wherein the evaluation device is configured for comparing the target parameter with a threshold value.

Embodiment 30. The system according to any one of the three preceding embodiments, the system further comprising:
  e) a liquid distribution element for combining at least two of the fractions comprising the target compound and/or a output device outputting the values of the target parameter determined in step d).

Embodiment 31. Use of the system according to any one of the two preceding embodiments and/or of the method according to any one of the preceding embodiments referring to a method, for a purpose selected from the group consisting of: producing a target compound, purifying a target compound, and removing impurities from a preparation of a target compound.

Embodiment 32. Use of a concentration determining device and for a nuclear magnetic resonance measurement device for separating a target compound in an aqueous solution according to the method according to any one of the preceding embodiments referring to a method.

Embodiment 33. A computer program product comprising instructions which, when executed on a suitable system comprising a computer, a concentration determining device, and a nuclear magnetic resonance (NMR) measurement device, cause at least the following steps to be performed I) determining a concentration parameter indicating a concentration of a target compound in at least one fraction of an aqueous solution comprising a target compound;

II) determining a nuclear magnetic resonance parameter by applying an NMR measurement to said at least one fraction, the NMR parameter indicating a nuclear magnetic spin relaxation, in an embodiment an NMR spin relaxation of water, in said at least one fraction; and III) determining a target parameter of said at least one fraction based on the concentration parameter and the NMR parameter.

Embodiment 34. The computer program according to the preceding embodiment, wherein step I), II), and/or III) is performed according to the method according to any one of the preceding embodiments referring to a method.

Embodiment 35. A method of production of a target compound, in particular a polypeptide, comprising the steps of the method according to any one of the preceding embodiments referring to a method.

Embodiment 36. A preparation of a target compound produced or producible according to the method according to any one of the preceding embodiments referring to a method.

Embodiment 37. A method for increasing concentration of a target compound in a solution by diafiltration, comprising A) determining a first gradient of a nuclear magnetic resonance parameter (NMR parameter) over time in said solution or in a fraction thereof, the NMR parameter indicating a nuclear magnetic spin relaxation, in an embodiment an NMR spin relaxation of water, in solution;

B) determining a second gradient of said NMR parameter over time in said solution or in a fraction thereof, and C) at least temporarily decreasing diafiltration rate and/or increasing stirring rate in case the value of said second gradient of said NMR parameter deviates at least 10%, in an embodiment at least 20%, in a further embodiment at least 30%, from the value of said first gradient of said NMR parameter.

Embodiment 38. The method of the preceding embodiment, wherein the time period of determining the first gradient of said NMR parameter is essentially identical to the time period of determining the second gradient of said NMR parameter.

Embodiment 39. The method of the preceding two embodiments, wherein the time period of determining the first and/or second gradient of said NMR parameter is at most 5 min, in an embodiment at most 2 min, in a further embodiment at most 1 min.

Embodiment 40. The method of the preceding three embodiments, wherein said first gradient of said NMR parameter is determined before said second gradient of said at least one NMR parameter.

Embodiment 41. The method of the preceding four embodiments, wherein a gradient of said NMR parameter is determined repeatedly, and wherein the most recently determined gradient of said NMR parameter is the second gradient of said NMR parameter, in an embodiment wherein the second to last determined gradient of said NMR parameter is the first gradient of said NMR parameter.

Embodiment 42. The method of the preceding five embodiments wherein a gradient of said NMR parameter is determined continuously or semi-continuously.

Embodiment 43. The method of the preceding six embodiments, wherein said at least temporarily decreasing diafiltration rate comprises stopping diafiltration for at least 5 min, in an embodiment for at least 15 min.

Embodiment 44: A database, in an embodiment tangibly embedded on a data carrier, comprising fraction numbers allocated to corresponding concentration parameter values, NMR parameter values, and/or target parameter values pre-established according to the separation method according to any one of embodiments 1 to 26.

Embodiment 45: A separation system, in an embodiment according to any one of embodiments 27 to 30, comprising the database according to embodiment 44, in an embodiment wherein said separation system is adapted to obtain at least one of a concentration parameter value, an NMR parameter value, and a target parameter value from said database.

Embodiment 46: The subject matter of any one of embodiments 1 to 45, wherein said target compound is an immunoconjugate comprising (i) an antibody that binds to PD-1 and (ii) a polypeptide that signals through IL-2Rβγ, particularly an IL-2 polypeptide or an IL-15 polypeptide.

Embodiment 47: The subject matter of embodiment 46, wherein the IL-2 polypeptide is a mutant IL-2 polypeptide, wherein the mutant IL-2 polypeptide is a human IL-2 molecule comprising the amino acid substitutions F42A, Y45A and L72G (numbering relative to the human IL-2 sequence SEQ ID NO: 19).

Embodiment 48: The subject matter of embodiment 46 or 47, wherein the IL-2 polypeptide is a mutant IL-2 polypeptide, wherein the mutant IL-2 polypeptide is a human IL-2 molecule comprising the amino acid substitutions F42A, Y45A and L72G (numbering relative to the human IL-2 sequence SEQ ID NO: 19); and wherein the antibody comprises (a) a heavy chain variable region (VH) comprising a HVR-H1 comprising the amino acid sequence of SEQ ID NO:1, a HVR-H2 comprising the amino acid sequence of SEQ ID NO:2, a HVR-H3 comprising the amino acid sequence of SEQ ID NO:3, and a FR-H3 comprising the amino acid sequence of SEQ ID NO:7 at positions 71-73 according to Kabat numbering, and (b) a light chain variable region (VL) comprising a HVR-L1 comprising the amino acid sequence of SEQ ID NO:4, a HVR-L2 comprising the amino acid sequence of SEQ ID NO:5, and a HVR-L3 comprising the amino acid sequence of SEQ ID NO:6.

Embodiment 49: The subject matter of any one of embodiments 46 to 48, wherein the IL-2 polypeptide is a mutant IL-2 polypeptide, wherein the mutant IL-2 polypeptide is a human IL-2 molecule comprising the amino acid substitutions F42A. Y45A and L72G (numbering relative to the human IL-2 sequence SEQ ID NO: 19); and wherein the antibody comprises (a) a heavy chain variable region (VH) comprising a HVR-H1 comprising the amino acid sequence of SEQ ID NO:8, a HVR-H2 comprising the amino acid sequence of SEQ ID NO:9, and a HVR-H3 comprising the amino acid sequence of SEQ ID NO:10, and (b) a light chain variable region (VL) comprising a HVR-L1 comprising the amino acid sequence of SEQ ID NO: 11, a HVR-L2 comprising the amino acid sequence of SEQ ID NO:12, and a HVR-L3 comprising the amino acid sequence of SEQ ID NO:13.

Embodiment 50: The subject matter of any one of embodiments 46 to 49, wherein the IL-2 polypeptide is a mutant IL-2 polypeptide, wherein the mutant IL-2 polypeptide is a human IL-2 molecule comprising the amino acid substitutions F42A, Y45A and L72G (numbering relative to the human IL-2 sequence SEQ ID NO: 19); and wherein the antibody comprises (a) a heavy chain variable region (VI-H) comprising an amino acid sequence that is at least about 95%, 96%, 97%, 98%, 99% or 100% identical to the amino acid sequence of SEQ ID NO:14, and (b) a light chain variable region (VL) comprising an amino acid sequence that is at least about 95%, 96%, 97%, 98%, 99% or 100% identical to an amino acid sequence selected from the group consisting of SEQ ID NO:15, SEQ ID NO:16, SEQ ID NO: 17, and SEQ ID NO:18.

Embodiment 51: The subject matter of any one of embodiments 46 to 50, wherein the mutant IL-2 polypeptide further comprises the amino acid substitution T3A and/or the amino acid substitution C125A.

Embodiment 52: The subject matter of any one of embodiments 47 to 51, wherein the mutant IL-2 polypeptide comprises the sequence of SEQ ID NO: 20.

Embodiment 53: The subject matter of any one of embodiments 47 to 52, wherein the immunoconjugate comprises not more than one mutant IL-2 polypeptide.

Embodiment 54: The subject matter of any one of embodiments 46 to 53, wherein the antibody comprises an Fc domain composed of a first and a second subunit.

Embodiment 55: The subject matter of embodiment 54, wherein the Fc domain is an IgG class, particularly an IgG1 subclass, Fc domain.

Embodiment 56: The subject matter of embodiment 54 or 55, wherein the Fc domain is a human Fc domain.

Embodiment 57: The subject matter of any one of embodiments 46 to 56, wherein the antibody is an IgG class, particularly an IgG1 subclass immunoglobulin.

Embodiment 58: The subject matter of any one of embodiments 54 to 57, wherein the Fc domain comprises a modification promoting the association of the first and the second subunit of the Fc domain.

Embodiment 59: The subject matter of any one of embodiments 54 to 58, wherein in the CH3 domain of the first subunit of the Fc domain an amino acid residue is replaced with an amino acid residue having a larger side chain volume, thereby generating a protuberance within the CH3 domain of the first subunit which is positionable in a cavity within the CH3 domain of the second subunit, and in the CH3 domain of the second subunit of the Fc domain an amino acid residue is replaced with an amino acid residue having a smaller side chain volume, thereby generating a cavity within the CH3 domain of the second subunit within which the protuberance within the CH3 domain of the first subunit is positionable.

Embodiment 60: The subject matter of any one of embodiments 54 to 59, wherein in the first subunit of the Fc domain the threonine residue at position 366 is replaced with a tryptophan residue (T366W), and in the second subunit of the Fc domain the tyrosine residue at position 407 is replaced with a valine residue (Y407V) and optionally the threonine residue at position 366 is replaced with a serine residue (T366S) and the leucine residue at position 368 is replaced with an alanine residue (L368A) (numberings according to Kabat EU index).

Embodiment 61: The subject matter of embodiment 60, wherein in the first subunit of the Fc domain additionally the serine residue at position 354 is replaced with a cysteine residue (S354C) or the glutamic acid residue at position 356 is replaced with a cysteine residue (E356C), and in the second subunit of the Fc domain additionally the tyrosine residue at position 349 is replaced by a cysteine residue (Y349C) (numberings according to Kabat EU index).

Embodiment 62: The subject matter of any one of embodiments 54 to 61, wherein the mutant IL-2 polypeptide is fused at its amino-terminal amino acid to the carboxy-terminal amino acid of one of the subunits of the Fc domain, particularly the first subunit of the Fc domain, optionally through a linker peptide.

Embodiment 63: The subject matter of embodiment 62, wherein the linker peptide has the amino acid sequence of SEQ ID NO:21.

Embodiment 64: The subject matter of any one of embodiments 54 to 63, wherein the Fc domain comprises one or more amino acid substitution that reduces binding to an Fc receptor, particularly an Fcγ receptor, and/or effector function, particularly antibody-dependent cell-mediated cytotoxicity (ADCC).

Embodiment 65: The subject matter of embodiment 64, wherein said one or more amino acid substitution is at one or more position selected from the group of L234, L235, and P329 (Kabat EU index numbering).

Embodiment 66: The subject matter of any one of embodiments 54 to 65, wherein each subunit of the Fc domain comprises the amino acid substitutions L234A, L235A and P329G (Kabat EU index numbering).

Embodiment 67: The subject matter of any one of embodiments 46 to 66, comprising a polypeptide comprising an amino acid sequence that is at least about 80%, 85%, 90%, 95%, 96%, 97%, 98%, 99% or 100% identical to the sequence of SEQ ID NO:22, a polypeptide comprising an amino acid sequence that is at least about 80%, 85%, 90%, 95%, 96%, 97%, 98%, 99% or 100% identical to the sequence of SEQ ID NO:23 or SEQ ID NO:24, and a polypeptide comprising an amino acid sequence that is at least about 80%, 85%, 90%, 95%, 96%, 97%, 98%, 99% or 100% identical to the sequence of SEQ ID NO:25.

Embodiment 68: The subject matter of any one of embodiments 46 to 67, essentially consisting of a mutant IL-2 polypeptide and an IgG1 immunoglobulin molecule, joined by a linker sequence.

Embodiment 69: The subject matter of any one of embodiments 1 to 45, wherein said target compound is an fusion protein comprising (i) an immunoglobulin molecule that is not capable of specific binding to an antigen and (ii) two mutant interleukin-2 (IL-2) molecules comprising an amino acid mutation that reduces affinity of the mutant IL-2 molecule to the intermediate affinity IL-2 receptor, as compared to a wild-type IL-2 molecule, wherein said mutant IL-2 molecules comprise the sequence of SEQ ID NO: 30.

Embodiment 70: The subject matter of embodiment 69, wherein said immunoglobulin molecule is an IgG-class immunoglobulin molecule, particularly an IgG1-subclass immunoglobulin molecule.

Embodiment 71: The subject matter of embodiment 69 or 70, wherein said immunoglobulin molecule is a human immunoglobulin molecule.

Embodiment 72: The subject matter of any one of embodiments 69 to 71, wherein said immunoglobulin molecule comprises a heavy chain variable region sequence based on the human Vh3-23 germline sequence.

Embodiment 73: The subject matter of any one of embodiments 69 to 72, wherein said immunoglobulin molecule comprises the heavy chain variable region sequence of SEQ ID NO: 26.

Embodiment 74: The subject matter of any one of embodiments 69 to 73, wherein said immunoglobulin molecule comprises a light chain variable region sequence based on the human Vk3-20 germline sequence.

Embodiment 75: The subject matter of any one of embodiments 69 to 74, wherein said immunoglobulin molecule comprises the light chain variable region sequence of SEQ ID NO: 27.

Embodiment 76: The subject matter of any one of embodiments 69 to 75, wherein said immunoglobulin molecule comprises a modification reducing binding affinity of the immunoglobulin molecule to an Fc receptor as compared to a corresponding immunoglobulin molecule without said modification.

Embodiment 77: The subject matter of embodiment 76, wherein said Fc receptor is an Fcγ receptor, particularly a human Fcγ receptor.

Embodiment 78: The subject matter of embodiment 76 or 77, wherein said Fc receptor is an activating Fc receptor.

Embodiment 79: The subject matter of any one of embodiments 76 to 78, wherein said Fc receptor is selected from the group of FcγRII 1a (CD16a), FcγRI (CD64), FcγRIIa (CD32) and FcaRI (CD89).

Embodiment 80: The subject matter of any one of embodiments 76 to 79, wherein said Fc receptor is FcγRIIIa, particularly human FcγRIIIa.

Embodiment 81: The subject matter of any one of embodiments 69 to 80, wherein said immunoglobulin molecule comprises an amino acid substitution at position 329 (EU numbering) of the immunoglobulin heavy chains.

Embodiment 82: The subject matter of embodiment 81, wherein said amino acid substitution is P329G.

Embodiment 83: The subject matter of any one of embodiments 69 to 82, wherein said immunoglobulin molecule comprises amino acid substitutions at positions 234 and 235 (EU numbering) of the immunoglobulin heavy chains.

Embodiment 84: The subject matter of embodiment 83, wherein said amino acid substitutions are L234A and L235A (LALA).

Embodiment 85: The subject matter of any one of embodiments 69 to 84, wherein said immunoglobulin molecule comprises the amino acid substitutions L234A, L235A and P329G (EU numbering) in the immunoglobulin heavy chains.

Embodiment 86: The subject matter of any one of embodiments 69 to 85, wherein said mutant IL-2 molecules are each fused at their N-terminal amino acid to the C-terminal amino acid of one of the immunoglobulin heavy chains of said immunoglobulin molecule, optionally through a peptide linker.

Embodiment 87: The subject matter of any one of embodiments 69 to 86, wherein said mutant IL-2 molecules are each fused to said immunoglobulin molecule through a peptide linker.

Embodiment 88: The subject matter of embodiment 87, wherein said peptide linker comprises at least 10, particularly at least 15, amino acids.

Embodiment 89: The subject matter of embodiment 87 or 88, wherein said peptide linker comprises the amino acid sequence (G4Sh (SEQ ID NO: 31).

Embodiment 90: The subject matter of any one of embodiments 69 to 89, wherein the fusion protein comprises the polypeptide sequences of SEQ ID NO: 28 and SEQ ID NO: 29.

Embodiment 91: The subject matter of any one of embodiments 1 to 45, wherein said target compound is a bispecific antibody.

Embodiment 92: The subject matter of embodiment 91, wherein said target compound is a bispecific antibody that binds to CD3 and a second antigen.

Embodiment 93: The subject matter of embodiment 91 or 92, wherein said target compound is a bispecific antibody that binds to CD3 and CEA.

Embodiment 94: The subject matter of any one of embodiments 91 to 93, wherein said target compound is a bispecific antibody that comprises a first, a second and a third Fab molecule and a Fc domain composed of two subunits.

Embodiment 95: The subject matter of embodiment 94, wherein the Fc domain is an IgG, specifically an IgG1, more specifically a human IgG1, Fc domain.

Embodiment 96: The subject matter of embodiment 94 or 95, wherein the first Fab molecule is fused at the C-terminus to the N-terminus of the second Fab molecule, the second Fab molecule is fused at the C-terminus to the N-terminus of one of the subunits of the Fc domain, and the third Fab molecule is fused at the C-terminus to the N-terminus of the other one of the subunits of the Fc domain.

Embodiment 97: The subject matter of any one of embodiment 94 to 96, wherein the second Fab molecule binds to CD3 and the first and the third Fab molecule bind to a second antigen.

Embodiment 98: The subject matter of any one of embodiments 92 to 97, wherein the second antigen is CEA.

Embodiment 99: The subject matter of any one of embodiments 91 to 98, wherein said target compound is cibisatamab.

Embodiment 100: The subject matter of any one of embodiments 1 to 45, wherein the target compound is a virus or a virus-like particle.

Embodiment 101: The subject matter of embodiment 100, wherein the target compound is a filled virus or a filled VLP comprising one or more polynucleotide(s).

Embodiment 102: The subject matter of embodiment 100 or 101, wherein said separation step is a step of separating filled virus particles and/or filled VLPs from empty virus particles and/or empty VLPs.

Embodiment 103: The subject matter of any of the preceding embodiments, wherein the concentration parameter is directly proportional to the concentration of the target compound.

Embodiment 104: The subject matter of any of the preceding embodiments, wherein the concentration parameter is not a water proton transverse relaxation time $T_2$ and is not a water proton transverse relaxation rate $R_2$, in an embodiment is not a water proton transverse relaxation NMR parameter.

SHORT DESCRIPTION OF THE FIGURES

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures.

Therein, identical reference numbers in these Figures refer to identical or functionally comparable elements.

In the Figures:

FIG. 1 shows schematically an exemplary setup of a separation system, comprising a separation device 110, e.g. configured as a chromatography column having a sample and mobile phase inlet 118: a concentration determining device 112 and an NMR measurement device 114 performing in-line measurements on the eluate from separation device 110 and providing measurement data to evaluation device 116, said evaluation device 116 optionally directing a valve in a liquid distribution element 120; as an alternative, liquid distribution element 120 may operate autonomously and may collect fractions 122 e.g. over predefined intervals.

FIG. 2 shows an overview of compounds (Antibody Like Proteins (ALPs)) used in the Examples; M: metal.

Figure 3:
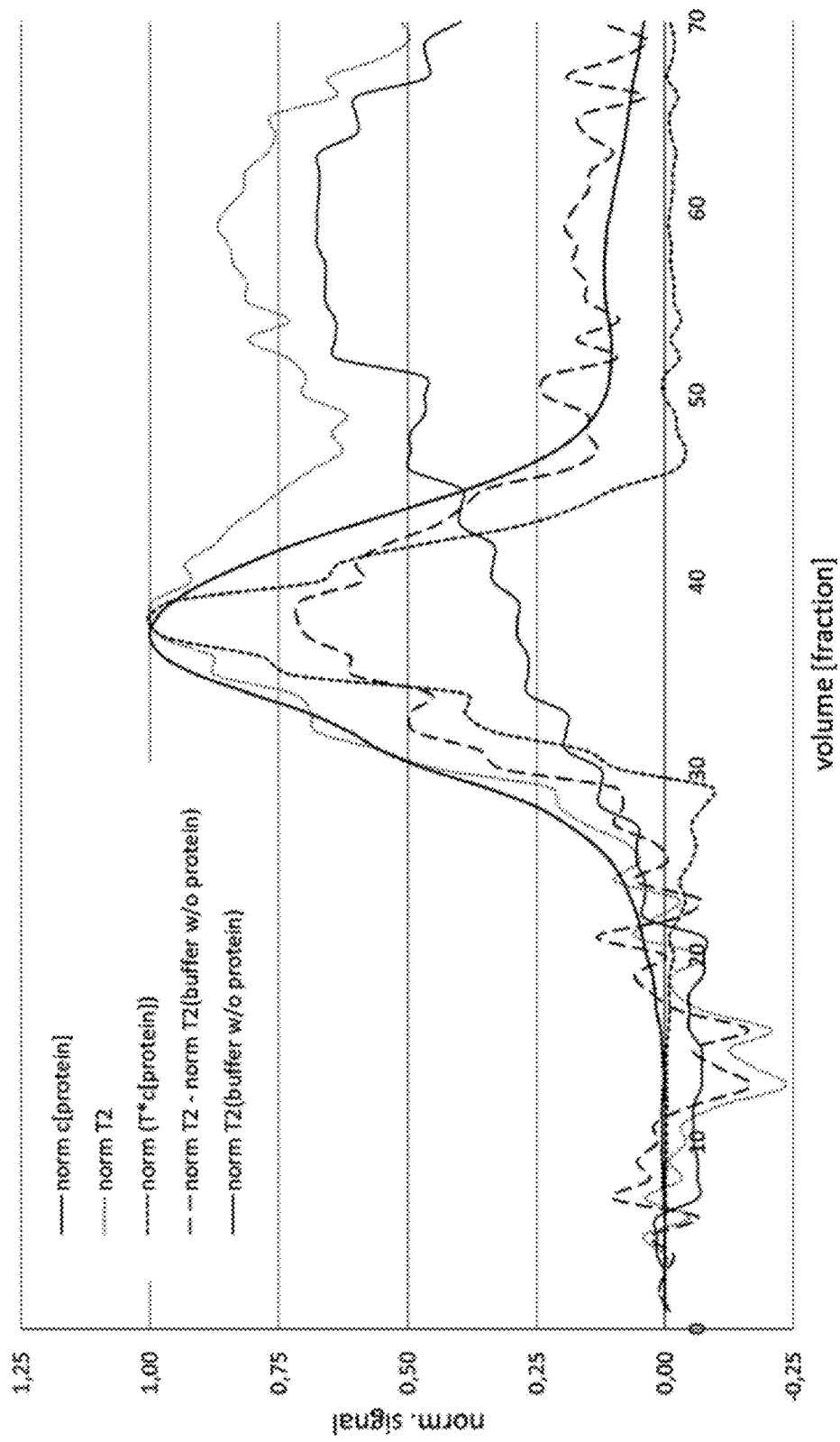

FIG. 3 shows a graphical representation of a variety of parameters in purification of a therapeutic antibody by cation exchange chromatography; parameters are: norm c[protein]: protein concentration normalized to the highest measured protein concentration; norm T2: T2 value normalized to the highest measured T2 value; norm (T*C[protein]): normalized product of T2 and c[protein]; norm T2 (buffer w/o protein): normalized T2 value from a test run in the absence of the antibody; and norm T2-norm T2 (buffer w/o protein): norm T2 from which norm T2 (buffer w/o protein) was subtracted.

Figure 4:
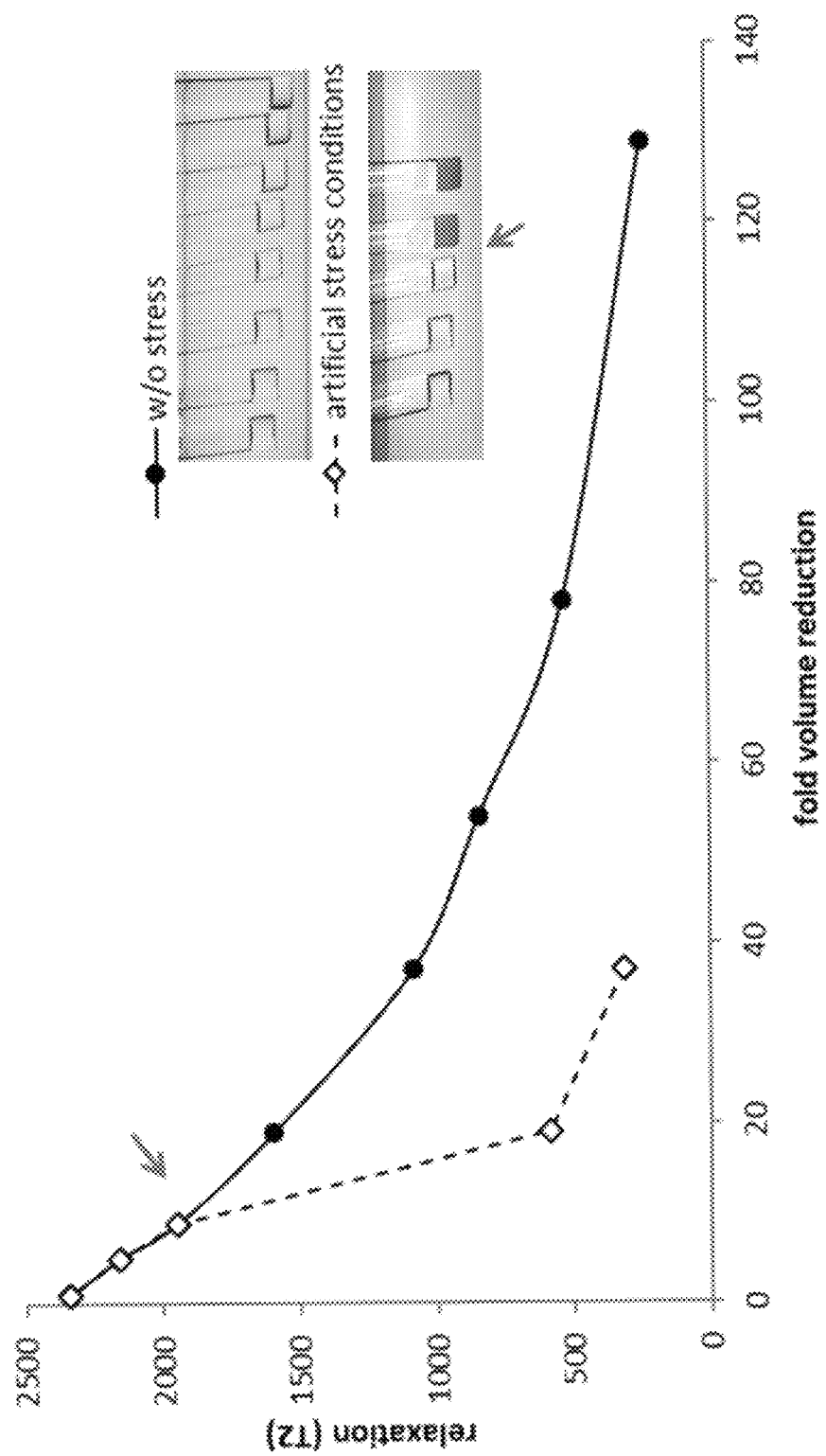

FIG. 4 shows wNMR relaxation T2 (y-axis) in dependence of increase of protein concentration (as fold volume reduction during the process, x-axis) for non-stressed (solid line) and artificially stressed (dashed line) protein solutions. The inserts show the appearance of the solutions, arrows indicate starting aggregation.

Figure 5:
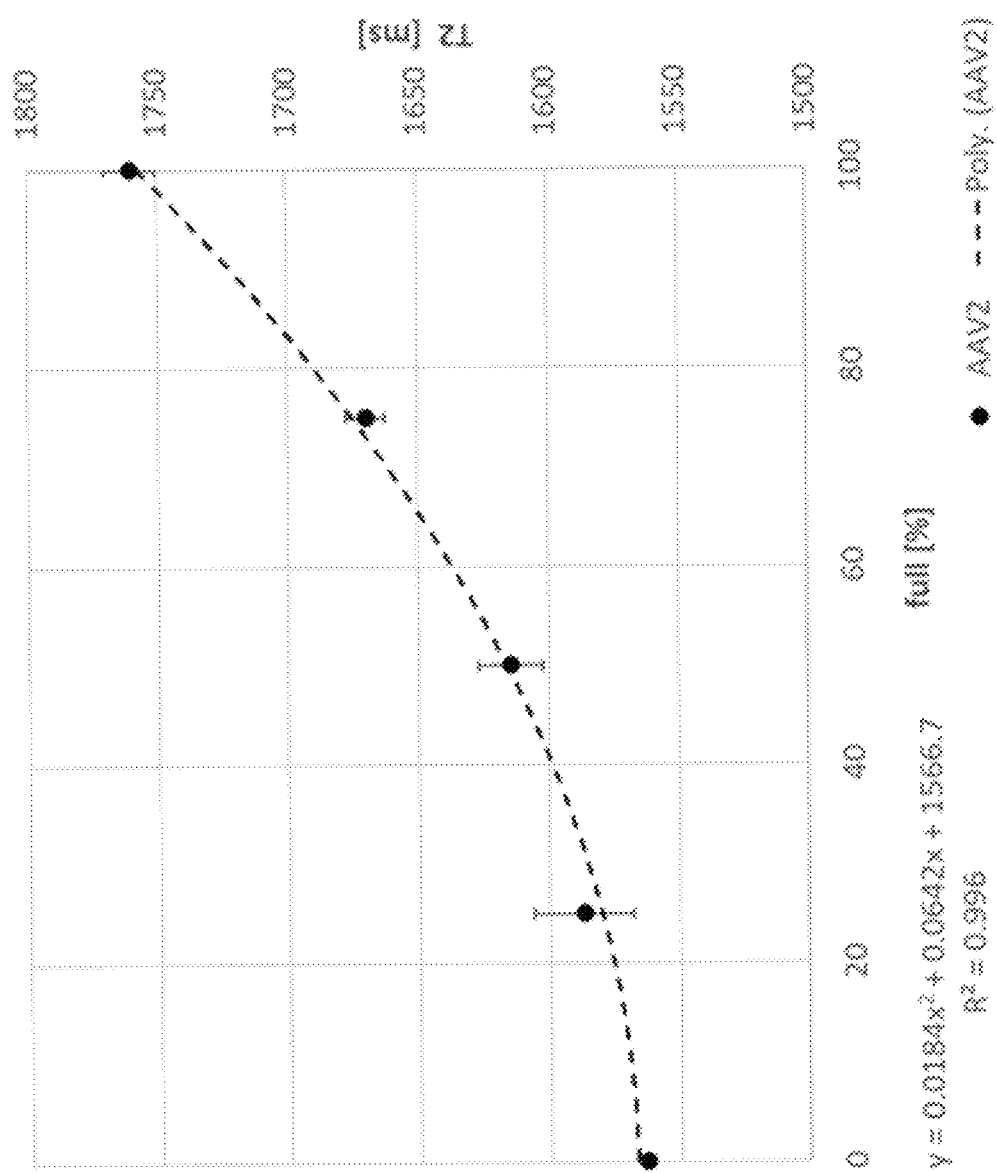

FIG. 5 Dependency of T2 on the DNA-loading of AAV particles of the serotype 2 (AAV2).

Figure 6:
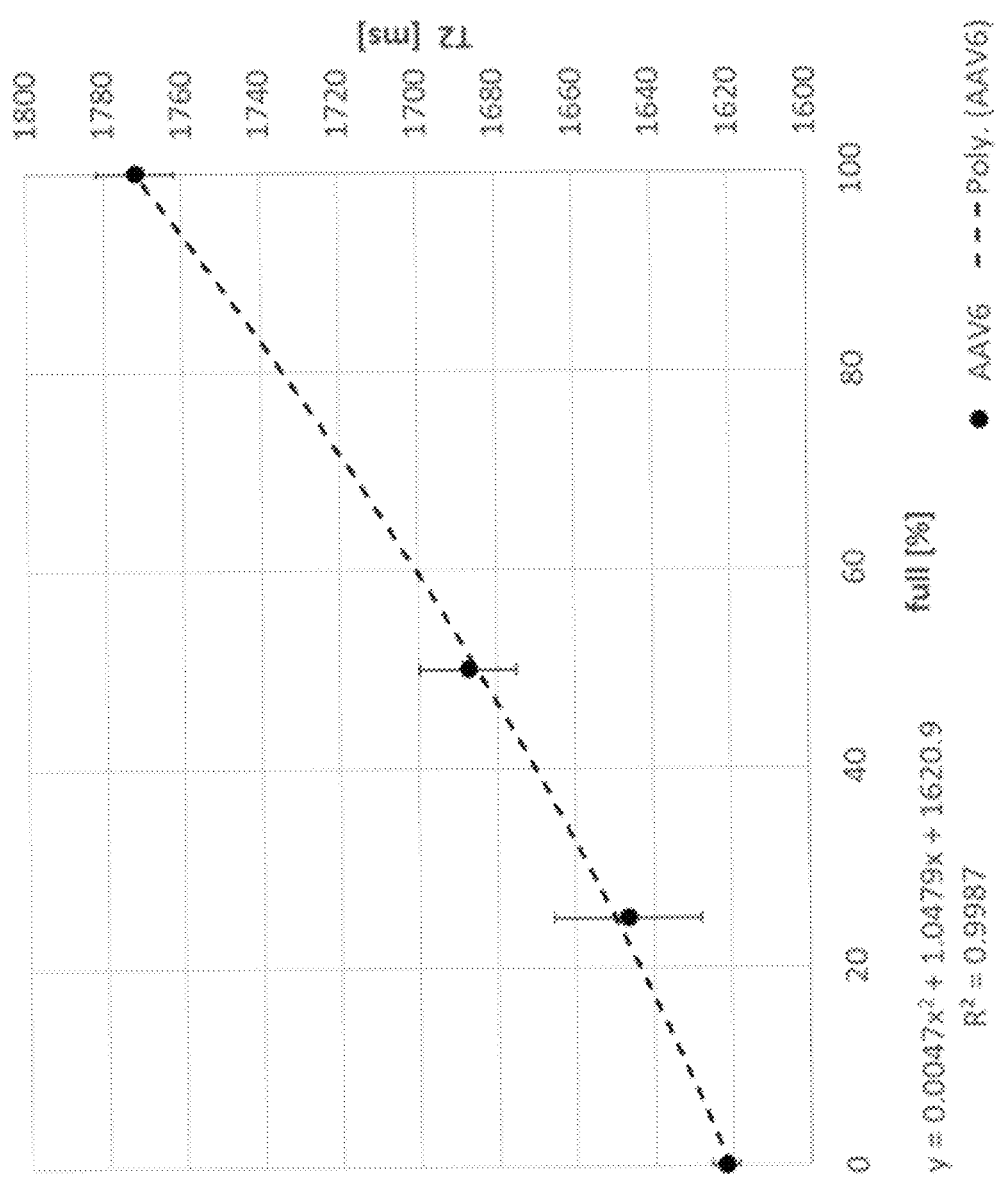

FIG. 6 Dependency of T2 on the DNA-loading of AAV particles of the serotype 6 (AAV6).

Figure 7:
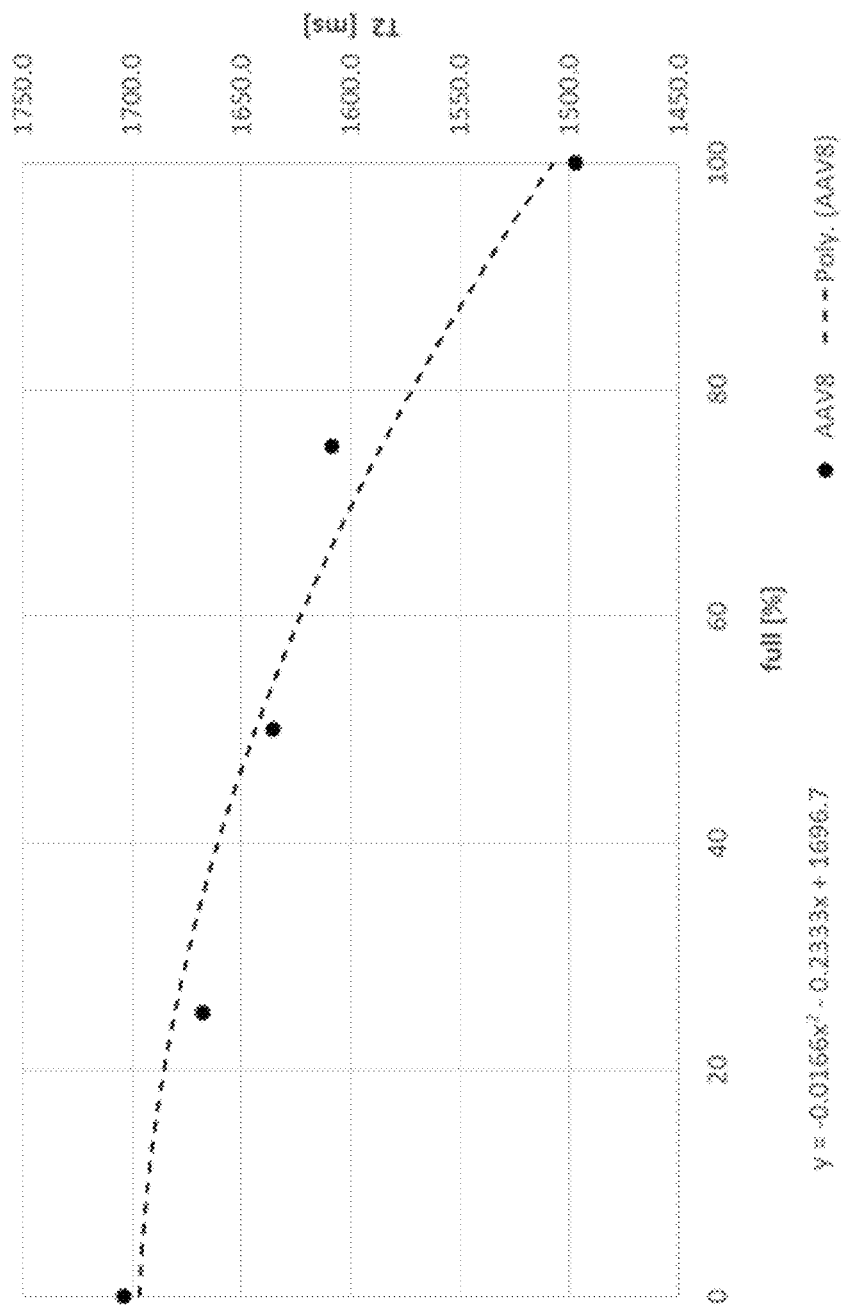

FIG. 7 Dependency of T2 on the DNA-loading of AAV particles of the serotype 8 (AAV8).

DETAILED DESCRIPTION OF THE EMBODIMENTS

Example 1: Materials and Methods

Antibody Like Proteins

An overview of the antibody Like Proteins (ALPs) used in the Examples is given in FIG. 2. Cibisatamab (ALP1) is a 2+1 bispecific antibody targeting carcinoembryonic antigen (CEA) and CD3, as described in WHO Drug Information (International Nonproprietary Names for Pharmaceutical Substances), Recommended INN: List 80, 2018, vol. 32, no. 3, p. 438; IgG-IL2 (ALP2) is a fusion protein between an IgG and two IL-2 peptides fused to the heavy chains, respectively, as described in WO 2015/118016 A1. PD1-IL2 (ALP3) is an anti-PD1 antibody C-terminally fused to an IL-2 peptide, as described in WO 20181184964 A1. ALP4 is a 2+1 bispecific fusion protein comprising an IgG structure fused to $V_H VL$-domains and to a metal complex.

NMR

Transverse relaxation rates (R2) or times (T2) were recorded with a Bruker minispec mq20 spectrometer (20 MHz; Bruker BioSpin GmbH, Rheinstetten, Germany). The spectrometer was equipped with a 0.47 T magnet and a H20-10-25AVGX4 probe. At least 4 acquisitions were measured for each sample with sample volumes of 900 µl at 20° C. To determine T2 or R2, signal decay was followed for at least 5 sec.

Preparation of Protein Load Solutions

The proteins used were expressed from stably transfected CHO cells. Fermentation supernatants were applied to MabSelect SuRe columns (GE Healthcare Europe GmbH, Freiburg, Germany) and eluted with acidic buffer solutions with a pH<5. After elution the protein pool was adjusted to a pi of 5.0 to 5.5 by adding adequate amounts of 1 M Tris solution.

Chromatography

SEC

Prior to size exclusion chromatographies the concentration of the protein A pools was increased to >20 mg/ml by ultrafiltration using an Amicon stirring cell with ultrafiltration discs having a 10 kDa or 30 kDa cut-off (Merck KGaA, Darmstadt, Germany). Size exclusion chromatography was done by loading 30 mg to 180 mg of protein A purified protein samples to a Superdex 20W prep grade column (60 cm column height, 1.6 cm diameter; GE Healthcare Europe GmbH, Freiburg. Germany). Chromatography runs were performed with a flow rate of 1.6 ml/min in 20 mM His/His-HCL, 140 mM NaCl, pH 5.5. During elution the absorption at 280 nm was recorded and fractions were collected.

CEX

For cation exchange chromatography (CEX) the proteins were loaded on 10 ml Poros XS columns (20 cm column height, 0.8 cm diameter; Thermo Fisher, Scientific, Waltham, Massachusetts, USA) with a load density between 25 mg/ml and 30 mg/ml.

For conductivity gradient elution, the column was equilibrated with 40 mM acetate pH 5.5. Then the protein A purified protein solution was loaded with 2.0 ml/min and the column was washed with 3 column volumes (CV) of equilibration buffer. For elution of the bound proteins an acetate gradient up 500 or 750 mM within 20 or 15 CV, respectively, and a flow rate of 2.5 ml/min was used at pH 5.5 or 6.5. During elution adsorption at 280 nm was recorded and fractions were collected.

For pH gradient elution, the column was equilibrated with 20 mM citrate, 20 mM sodium phosphate, 20 mM Tris, pH 5.0 and a NaCl concentration between 50 mM and 100 mM. Then the protein A purified protein solution was loaded with 2.0 ml/min and the column washed with 5 CV equilibration buffer. For elution of the bound proteins a pH gradient from 5.0 to 8.5 within 20 to CV and a flow rate of 2.5 ml/min was used. During elution adsorption at 280 nm was recorded and eluate fractions were collected.

In addition, buffer control runs were performed for conductivity and pH gradient elutions. For these runs, the above described procedures were used, but no protein loaded to the column.

Analytical SEC

Pools and fractions of the chromatographies were analyzed by analytical SEC. To that end, approximately 25 µg (but not more than 100 µl) of protein were injected on a TSKgel UP-SW3000 column (Tosoh Bioscience, Griesheim. Germany) and subjected to isocratic chromatography in 200 mM potassium phosphate, 250 mM potassium chloride, pH 6.2 with a flow rate of 0.25 ml/min. Purities were calculated based on absorption at 280 nm with the Software Chromeleon 7 (Thermo Fisher, Scientific, Waltham, Massachusetts, USA).

UF

Ultrafiltration was done with a manual benchtop device with a 400 ml vessel and a 30 kDa Sartorius (Sartorius A G, Göttingen, Germany) membrane. The device was regenerated with 0.5 M NaOH, flushed with water and equilibrated with the corresponding buffer until pH and conductivity of the equilibration buffer was constant. Subsequently, the equilibration buffer was exchanged by the protein solution. Ultrafiltration was run under pressure control of 1-1.2 bar.

Samples were taken after defined volume reductions. Protein concentration. SE-HPLC and wNMR T2 were determined for each sample. Two sets of experiments were run.

One at RT and one under artificial stress conditions (50° C.). Artificial stress was applied to induce rapid HMW formation at a specific concentration.

Example 2

As shown in FIG. 1, in the separation system the sample 118 is applied to the separation device 118, which may be an LC column, membrane, or filter, an ultracentrifuge or centrifuge beaker, an ultrafiltration device, or the like. By the separation step and by means of liquid distribution element 120, fractions 122 are formed of which at least two differ in composition. In at least part of the fractions or in aliquots thereof, concentration of the target compound or of the class of compound the target compound belongs to is determined by the concentration determining device 112, which may in particular be a photometer, e.g. a UV-photometer. Also in at least part of the fractions or in aliquots thereof, an NMR parameter is determined by the NMR measurement device 114, which may in particular be a benchtop NM R device. Determination of the concentration parameter and/or the NMR parameter may be performed before the actual formation of fractions by the liquid distribution element 120, as shown in FIG. 1, e.g. by flow-through measurement, or may be performed after formation of the fractions in the established fractions or aliquots thereof. Based on the values of the concentration parameter and of the NMR parameter, the evaluation device 116 determines a target parameter.

Example 3

FIG. 3 shows a graphical representation of the change of a variety of parameters over the elution volume in purification of a therapeutic antibody by cation exchange chromatography. As will be appreciated, the standard measurement of protein concentration by absorption measurement at 280 nm (solid line) provides a broad peak making it impossible to determine which fractions comprise the desired monomeric antibody. In contrast, the graphical representation of the normalized product of T2 and c[protein] (short-dashed line) show a much narrower peak, excluding in particular undesired aggregates of the antibody.

Example 4

Four different Antibody Like Proteins (ALPs, FIG. 2, Table 1) were applied to LC purification by cation exchange chromatography using either an acetate or a pH gradient, or by size exclusion chromatography (SEC). After chromatography, fractions were pooled according to c[protein] determination (UV measurement) alone, according to normalized T2 alone, or according to the normalized product of T2 and c[protein] (Table 2). The composition of the pools used for chromatography is shown in Table 1. As is clear from the data, using a combination of T2 and c[protein] as the target parameter provides for improved purity of the product and in particular improved removal of high and/or low molecular weight contaminants.

TABLE 1

Compositions of the protein solutions applied to the indicated LC columns; ALP: Antibody Like Protein; HMW: High molecular weight (aggregates), LMW: low molecular weight (degradation products), na: not applicable/not determined, SEC: size exclusion chromatography.

| Target compound | Column | HMW | Dimer | Monomer | LMW |
|---|---|---|---|---|---|
| ALP1 | SEC | 15.6 | na | 81.4 | 2.93 |
| ALP1 | Poros XS | 10.2 | na | 85.0 | 4.81 |
| ALP2 | SEC | 9.53 | na | 90.0 | 0.44 |
| ALP3 | Poros XS | 5.58 | na | 93.1 | 1.34 |
| ALP4 | SEC | 12.6 | 19.3 | 68.0 | na |
| ALP4 | Poros XS | 10.5 | 21.75 | 67.7 | na |

TABLE 2

Compositions of the protein solutions applied to the indicated LC steps after pooling according to c[protein] determination (UV measurement) alone (c[protein]), according to normalized T2 alone (normalized T2), and according to the normalized product of T2 and c[protein] (T2 and c[protein]): HMW: high molecular weight (aggregates), LMW: low molecular weight (degradation products), na: not applicable/not determined, SEC: size exclusion chromatography.

| Target compound | Column | Gradient | c[protein] | | | | | normalized T2 | | | | | T2 and c[protein] | | | | |
|---|---|---|---|---|---|---|---|---|---|---|---|---|---|---|---|---|---|
| | | | Yield [%] | HMW [%] | Dimer [%] | Monomer [%] | LMW [%] | Yield [%] | HMW [%] | Dimer [%] | Monomer [%] | LMW [%] | Yield [%] | HMW [%] | Dimer [%] | Monomer [%] | LMW [%] |
| ALP1 | Poros XS | pH | 84 | 4.7 | na | 93 | 2.2 | 69 | 3.5 | na | 95 | 1 | 43 | 2.1 | na | 97 | 1.0 |
| ALP2 | SEC | isocratic | | | | | | | | | | | 84 | 1.0 | na | 99 | 1.0 |
| ALP3 | Poros XS | pH | 72 | 4.0 | na | 95 | 1.4 | 69 | 2.4 | na | 96 | 1.4 | 43 | 1.3 | na | 98 | 1.0 |
| ALP4 | SEC | isocratic | | | | | | | | | | | 61 | 1.4 | 2.6 | 96 | na |
| ALP4 | Poros XS | acetate | 82 | 7.0 | 21 | 72 | na | 79 | 7.1 | 21 | 72 | na | 62 | 6.1 | 17 | 77 | na |
| ALP4 | Poros XS | pH | 88 | 7.0 | 21. | 72 | na | 81 | 5.6 | 21 | 73 | na | 64 | 2.5 | 14 | 83 | na |

Example 4

Protein solutions at various concentrations were artificially stressed to induce aggregation, or not, and wNMR-T2 values were measured. As shown in FIG. 4, starting aggregation causes a rapid drop in the T2 signal, which can be used to detect starting aggregation in ultrafiltration methods.

Example 5: Filled and Empty AAV Capsids

Materials and Methods

AAV Particles

DNA-loaded AAV particles as well as empty AAV particles of different serotypes were purchased from Virovek, Hayward, CA, United States of America. For filled AAV particles, the concentration of vg/mL (virus genomes per mL) equals the concentration of vp/mL (virus particles per mL) as one genome is packaged in one particle; for empty AAV particles, the number of vp/mL can be determined e.g. by comparing the amount of capsid protein(s) to the amount of capsid protein(s) in a preparation of filled AAV particles with a known concentration in vg/mL. The DNA is of the DNA-loaded AAV particles comprised an expression cassette for green fluorescent protein with a CMV promoter (CMV-GFP):

AAV8-empty (Lot 19-564E); AAV8-CMV-GFP (Lot 18-737) in 1×PBS buffer containing 0.001% pluronic F-68, and 0.22 µm filter sterilized.

AAV2-empty (Lot 19-604E)/AAV2-CMV-GFP (Lot 17-600) in 1×PBS buffer containing 0.001% pluronic F-68, 100 mM sodium citrate and 0.22 µm filter sterilized.

AAV6-empty (Lot 19-540E)/AAV2-CMV-GFP (Lot 19-718) in 1×PBS buffer containing 0.001% pluronic F-68, 100 mM sodium citrate and 0.22 µm filter sterilized.

NMR

Transverse relaxation rates ($R_2$) or times ($T_2$) were recorded as specified herein above in Example 1.

Preparation of AAV Samples

The samples were generated by mixing full and empty AAV2, AAV6 and AAV8 particles, respectively, having the same concentration ($2*10^{13}$ vg/ml) dissolved in the same aqueous solution comprising 1×PBS buffer containing 0.001% (w/v) pluronic F-68 (for AAV8) and containing 0.001% (w/v) Pluronic F-68 as well as, for AAV2 and AAV6, 100 mM sodium citrate at different ratios. Samples were measured without further longtime storage e.g. <0° C.

Example 5.1

Determination of the Transverse Relaxation Times for Different Ratios of DNA-Loaded and Empty AAV Particles DNA-loaded AAV particles and empty AAV particles were mixed in aqueous solution (AAV2 and AAV6: 1×PBS buffer containing 0.001% a (w/v) pluronic F-68, 100 mM sodium citrate; AAV8 same buffer without sodium citrate) to result in different full/empty ratios spanning the range from 0% to 100% DNA-loaded AAV particle. This has been done for AAV particles of the to serotypes 2, 6 and 8. For the individual samples, the transverse relaxation time, ($T_2$) were recorded as outlined in the Materials and Methods section above. The results are presented in the following Tables.

TABLE 3

$T_2$ values for differently DNA-loaded AAV2 particle samples.

| ratio full/empty | concentration of DNA-loaded AAV2 particles | fraction | transverse relaxation time [ms] | | | |
|---|---|---|---|---|---|---|
| | | | experiment 1 | experiment 2 | average | standard deviation |
| 0:100 | 0 vg/mL | 0.00 | 1559.9 | 1566.9 | 1563.4 | 3.5 |
| 25:75 | $0.5 * 10^{13}$ vg/mL | 0.25 | 1605.8 | 1568.0 | 1586.9 | 18.9 |
| 50:50 | $1 * 10^{13}$ vg/mL | 0.5 | 1627.0 | 1602.4 | 1614.7 | 12.3 |
| 75:25 | $1.5 * 10^{13}$ vg/mL | 0.75 | 1677.6 | 1662.4 | 1670.0 | 7.6 |
| 100:0 | $2 * 10^{13}$ vg/mL | 1.00 | 1750.6 | 1770.3 | 1760.5 | 9.9 |

TABLE 4

$T_2$ values for differently DNA-loaded AAV6 particle samples.

| ratio full/empty | concentration of DNA-loaded AAV6 particles | fraction | transverse relaxation time [ms] | | | |
|---|---|---|---|---|---|---|
| | | | experiment 1 | experiment 2 | average | standard deviation |
| 0:100 | 0 vg/mL | 0.00 | 1629.9 | 1614.2 | 1622.1 | 7.9 |
| 25:75 | $0.5 * 10^{13}$ vg/mL | 0.25 | 1664.6 | 1629.1 | 1646.9 | 17.8 |
| 50:50 | $1 * 10^{13}$ vg/mL | 0.5 | 1700.7 | 1673.3 | 1687.3 | 13.5 |
| 75:25 | $1.5 * 10^{13}$ vg/mL | 0.75 | 1688.5 | 1688.5 | 1688.5 | 0.0 |
| 100:0 | $2 * 10^{13}$ vg/mL | 1.00 | 1757.5 | 1786.1 | 1771.8 | 14.3 |

The value for the 75:25 ratio was excluded for the fitting calculation due to being deemed to be an experimental error.

TABLE 5

T$_2$ values for differently DNA-loaded AAV8 particle samples.

| ratio full/empty | concentration of DNA-loaded AAV8 particles | fraction | transverse relaxation time [ms] |
|---|---|---|---|
| 0:100 | 0 vg/mL | 0.00 | 1704.2 |
| 25:75 | 0.5*10$^{13}$ vg/mL | 0.25 | 1668.0 |
| 50:50 | 1*10$^{13}$ vg/mL | 0.5 | 1635.6 |
| 75:25 | 1.5*10$^{13}$ vg/mL | 0.75 | 1608.9 |
| 100:0 | 2*10$^{13}$ vg/mL | 1.00 | 1497.3 |

The obtained transverse relaxation times were fitted using linear and second order polynomial functions. The results are presented in the following Table 6.

TABLE 6

Fitting results. For the serotype 6 the fitting is shown including (in brackets) and excluding the data for the 75:25 ratio.

| AAV serotype | function | $R^2$ value |
|---|---|---|
| | linear fitting | |
| 2 | 1.9088*x + 1543.7 | 0.9208 |
| 6 | 1.5298*x + 1615.1 | 0.9905 |
| | (1.3646*x + 1615.1) | (0.8984) |
| 8 | −1.8916*x + 1717.4 | 0.9026 |
| | 2$^{nd}$ order polynomial fitting | |
| 2 | 0.0184*x$^2$ + 0.0642*x + 1566.7 | 0.996 |
| 6 | 0.0047*x$^2$ + 1.0479*x + 1620.9 | 0.9987 |
| | (0.0089*x$^2$ + 0.4749*x + 1626.2) | (0.9318) |
| 8 | −0.0166*x$^2$ − 0.2333*x + 1696.7 | 0.9633 |

FIG. 5 shows the dependency of T2 on the DNA-loading of AAV particles of the serotype 2 (AAV2), i.e. the dependency of T2 on the concentration of DNA-containing AAV2 particles in an aqueous sample. It can be seen that the absolute difference in the relaxation time between empty AAV2 particles (0% full) and completely DNA-loaded AAV2 particles (100% full) at a concentration of 2*10$^{13}$ particles/mL is 197.1±6.4 ms and the relative difference is 12.6±0.4%. The data points can be fitted with a second order function with an $R^2$ value of 0.996.

FIG. 6 shows the dependency of T2 on the DNA-loading of AAV particles of the serotype 6 (AAV6), i.e. the dependency of T2 on the concentration of DNA-containing AAV6 particles in an aqueous sample. It can be seen that the absolute difference in the relaxation time between empty AAV6 particles (0% full) and completely DNA-loaded AAV6 particles (100% full) at a concentration of 2*10$^{13}$ particles/mL is 149.8±22.1 ms and the relative difference is 9.2±1.4%. The data points can be fitted with a second order function with an $R^2$ value of 0.9987.

FIG. 7 shows the dependency of T2 on the DNA-loading of AAV particles of the serotype 8 (AAV8), i.e. the dependency of T2 on the concentration of DNA-containing AAV8 particles in an aqueous sample. It can be seen that the absolute difference in the relaxation time between empty AAV8 particles (0% full) and completely DNA-loaded AAV8 particles (100% full) at a concentration of 2*10$^{13}$ particles/mL is 206.9 ms and the relative difference is 14%. The data points can be fitted with a second order function with an $R^2$ value of 0.9633.

LITERATURE

Feng et al. (2015), Chem. Commun. 51: 6804
Hills et al. (1989), Molecular Physics, 67(4):903-918)
Metz and Mäder (2008), International Journal or Pharmaceutics 364:170-175
Shigemitsu et al. (2016), Analytical Biochemistry 498:59-67
Taraban et al. (2015), Journal of Pharmaceutical Sciences 104:4132-4141
Taraban et al. (2017), Analytical Chemistry 89:5494-5502
Taraban et al. (2019), 7th Annual PANIC Conference, Poster presentation P35: "Water Flow-NMR—A Prospective Contact-Free In-Line Analytical Tool for Continuous Biomanufacturing"
Taraban et al. (2019). Anal Chem 91(6):4107
WO 2012/015912A1
WO 2014/169229 A1
WO 2015/118016 A1
WO 2018/102681 A1
WO 2018/184964 A1
WO 2019/016154A1

LIST OF REFERENCE NUMBERS 110 separation device
112 concentration determining device
114 NMR measurement device
116 evaluation device
118 sample (aqueous solution)/mobile phase inlet
120 liquid distribution element
122 fractions

The invention claimed is:

1. A separation method comprising:
 i) providing an aqueous solution comprising a target compound;
 ii) applying a separation step to the aqueous solution, thereby providing a plurality of fractions of the aqueous solution;
 iii) determining a concentration parameter indicating a concentration of the target compound in at least part of the fractions;
 iv) determining a nuclear magnetic resonance (NMR) parameter indicative of a transverse nuclear magnetic spin relaxation of water by applying an NMR measurement to the fractions; and
 v) determining a target parameter of said at least part of the fractions based on the concentration parameter and the NMR parameter.

2. The method of claim 1, wherein the NMR parameter is indicative of a transverse nuclear magnetic spin relaxation of protons in water.

3. The method of claim 1, wherein the NMR parameter comprises at least one of a transverse nuclear magnetic spin relaxation time $T_2$ and a transverse nuclear magnetic spin relaxation rate $R_2$.

4. The method of claim 1, wherein the concentration parameter is directly proportional to the concentration of the target compound.

5. The method of claim 1, wherein the concentration parameter is not an NMR parameter indicative of a transverse nuclear magnetic spin relaxation of water.

6. The method of claim 1, wherein the target parameter is directly proportional to the concentration parameter and to the NMR parameter being the transverse relaxation time (T2).

7. The method of claim 1, wherein the target parameter is directly proportional to the product of the concentration parameter and the NMR parameter being the transverse relaxation time (T2).

8. The method of claim 1, further comprising step vi) identifying, based on the target parameter, fractions comprising the target compound at a desired purity.

9. The method of claim 8, further comprising step vii) combining at least two of the fractions comprising the target compound at a desired purity.

10. The method of claim 1, wherein the separation step in step ii) comprises a chromatographic separation, wherein the fractions are fractions of an eluate of the chromatographic separation.

11. The method of claim 1, wherein the separation step in step ii) comprises size-exclusion chromatography or ion exchange chromatography.

12. The method of claim 1, wherein the method is a continuous in-line method and/or wherein, in step ii), the fractions are generated as a continuous stream of liquid.

13. The method of claim 1, wherein the target compound comprises, in an embodiment is, a compound selected from the group consisting of (i) a polypeptide, (ii) a polynucleotide, (iii) a complex of one of (i) or (ii); and (iv) a conjugate of one of (i) to (iii).

14. The method of claim 1, wherein the target compound comprises, in an embodiment is, a polypeptide.

15. The method of claim 1, wherein the target compound comprises, in an embodiment is, a non-aggregated polypeptide.

16. The method of claim 1, wherein said target compound is a virus or a virus-like particle.

17. The method of claim 1, wherein said concentration parameter is determined in a direct photometric assay.

18. The method of claim 1, wherein the concentration parameter is the absorption, extinction, or fluorescence of the target compound.

19. A method of production of a target compound, in particular a polypeptide, comprising the steps of the method according to claim 1.

20. A preparation of a target compound produced or producible according to the method according to claim 1.

21. A separation system, comprising:
 a) a separation device configured for applying a separation step to an aqueous solution comprising a target compound, thereby providing a plurality of fractions of the aqueous solution;
 b) a concentration determining device configured for determining a concentration parameter indicating a concentration of the target compound in at least part of the fractions;
 c) a nuclear magnetic resonance (NMR) measurement device configured for determining an NMR parameter indicative of a transverse nuclear magnetic spin relaxation of water by applying an NMR measurement to the fractions, and
 d) an evaluation device configured for determining a target parameter of said at least part of the fractions based on the concentration parameter and the NMR parameter.

22. The system of claim 21, the system further comprising:
 e) a liquid distribution element for combining at least two of the fractions comprising the target compound and/or an output device outputting the values of the target parameter determined in step d).

23. A method for increasing concentration of a target compound in a solution by diafiltration, comprising:
 A) determining a first gradient of a nuclear magnetic resonance parameter (NMR parameter) indicative of a transverse nuclear magnetic spin relaxation of water over time in said solution or in a fraction thereof,
 B) determining a second gradient of said NMR parameter over time in said solution or in a fraction thereof, and
 C) at least temporarily decreasing diafiltration rate and/or increasing stirring rate in case the value of said second gradient of said NMR parameter deviates at least 10%, from the value of said first gradient of said NMR parameter.

* * * * *

SEQUENCE LISTING

```
Sequence total quantity: 31
SEQ ID NO: 1            moltype = AA  length = 4
FEATURE                 Location/Qualifiers
REGION                  1..4
                        note = Synthetic construct
source                  1..4
                        mol_type = protein
                        organism = synthetic construct
SEQUENCE: 1
SSYT                                                                    4

SEQ ID NO: 2            moltype = AA  length = 8
FEATURE                 Location/Qualifiers
REGION                  1..8
                        note = Synthetic construct
source                  1..8
                        mol_type = protein
                        organism = synthetic construct
```

```
SEQUENCE: 2
SGGGRDIY                                                              8

SEQ ID NO: 3            moltype = AA  length = 5
FEATURE                 Location/Qualifiers
REGION                  1..5
                        note = Synthetic Construct
source                  1..5
                        mol_type = protein
                        organism = synthetic construct
SEQUENCE: 3
GRVYF                                                                 5

SEQ ID NO: 4            moltype = AA  length = 6
FEATURE                 Location/Qualifiers
REGION                  1..6
                        note = Synthetic Construct
source                  1..6
                        mol_type = protein
                        organism = synthetic construct
SEQUENCE: 4
TSDNSF                                                                6

SEQ ID NO: 5            moltype = AA  length = 7
FEATURE                 Location/Qualifiers
REGION                  1..7
                        note = Synthetic Construct
source                  1..7
                        mol_type = protein
                        organism = synthetic construct
SEQUENCE: 5
RSSTLES                                                               7

SEQ ID NO: 6            moltype = AA  length = 6
FEATURE                 Location/Qualifiers
REGION                  1..6
                        note = Synthetic Construct
source                  1..6
                        mol_type = protein
                        organism = synthetic construct
SEQUENCE: 6
NYDVPW                                                                6

SEQ ID NO: 7            moltype =    length =
SEQUENCE: 7
000

SEQ ID NO: 8            moltype = AA  length = 7
FEATURE                 Location/Qualifiers
REGION                  1..7
                        note = Synthetic Construct
source                  1..7
                        mol_type = protein
                        organism = synthetic construct
SEQUENCE: 8
GFSFSSY                                                               7

SEQ ID NO: 9            moltype =    length =
SEQUENCE: 9
000

SEQ ID NO: 10           moltype = AA  length = 9
FEATURE                 Location/Qualifiers
REGION                  1..9
                        note = Synthetic Construct
source                  1..9
                        mol_type = protein
                        organism = synthetic construct
SEQUENCE: 10
TGRVYFALD                                                             9

SEQ ID NO: 11           moltype = AA  length = 11
FEATURE                 Location/Qualifiers
REGION                  1..11
                        note = Synthetic Construct
source                  1..11
                        mol_type = protein
                        organism = synthetic construct
SEQUENCE: 11
```

```
SESVDTSDNS F                                                                11

SEQ ID NO: 13           moltype = AA  length = 6
FEATURE                 Location/Qualifiers
REGION                  1..6
                        note = Synthetic Construct
source                  1..6
                        mol_type = protein
                        organism = synthetic construct
SEQUENCE: 13
NYDVPW                                                                       6

SEQ ID NO: 14           moltype = AA  length = 120
FEATURE                 Location/Qualifiers
REGION                  1..120
                        note = Synthetic Construct
source                  1..120
                        mol_type = protein
                        organism = synthetic construct
SEQUENCE: 14
EVQLLESGGG LVQPGGSLRL SCAASGFSFS SYTMSWVRQA PGKGLEWVAT ISGGGRDIYY            60
PDSVKGRFTI SRDNSKNTLY LQMNSLRAED TAVYYCVLLT GRVYFALDSW GQGTLVTVSS           120

SEQ ID NO: 15           moltype = AA  length = 111
FEATURE                 Location/Qualifiers
REGION                  1..111
                        note = Synthetic Construct
source                  1..111
                        mol_type = protein
                        organism = synthetic construct
SEQUENCE: 15
DIVMTQSPDS LAVSLGERAT INCKASESVD TSDNSFIHWY QQKPGQSPKL LIYRSSTLES            60
GVPDRFSGSG SGTDFTLTIS SLQAEDVAVY YCQQNYDVPW TFGQGTKVEI K                    111

SEQ ID NO: 16           moltype = AA  length = 111
FEATURE                 Location/Qualifiers
REGION                  1..111
                        note = Synthetic Construct
source                  1..111
                        mol_type = protein
                        organism = synthetic construct
SEQUENCE: 16
DVVMTQSPLS LPVTLGQPAS ISCRASESVD TSDNSFIHWY QQRPGQSPRL LIYRSSTLES            60
GVPDRFSGSG SGTDFTLKIS RVEAEDVGVY YCQQNYDVPW TFGQGTKVEI K                    111

SEQ ID NO: 17           moltype = AA  length = 111
FEATURE                 Location/Qualifiers
REGION                  1..111
                        note = Synthetic Construct
source                  1..111
                        mol_type = protein
                        organism = synthetic construct
SEQUENCE: 17
EIVLTQSPAT LSLSPGERAT LSCRASESVD TSDNSFIHWY QQKPGQSPRL LIYRSSTLES            60
GIPARFSGSG SGTDFTLTIS SLEPEDFAVY YCQQNYDVPW TFGQGTKVEI K                    111

SEQ ID NO: 18           moltype = AA  length = 111
FEATURE                 Location/Qualifiers
REGION                  1..111
                        note = Synthetic Construct
source                  1..111
                        mol_type = protein
                        organism = synthetic construct
SEQUENCE: 18
EIVLTQSPAT LSLSPGERAT LSCRASESVD TSDNSFIHWY QQKPGQSPRL LIYRSSTLES            60
GIPARFSGSG SGTDFTLTIS SLEPEDFAVY YCQQNYDVPW TFGQGTKVEI K                    111

SEQ ID NO: 19           moltype = AA  length = 133
FEATURE                 Location/Qualifiers
source                  1..133
                        mol_type = protein
                        organism = Homo sapiens
SEQUENCE: 19
APTSSSTKKT QLQLEHLLLD LQMILNGINN YKNPKLTRML TFKFYMPKKA TELKHLQCLE            60
EELKPLEEVL NLAQSKNFHL RPRDLISNIN VIVLELKGSE TTFMCEYADE TATIVEFLNR           120
```

```
WITFCQSIIS TLT                                                               133

SEQ ID NO: 20           moltype = AA  length = 133
FEATURE                 Location/Qualifiers
REGION                  1..133
                        note = Synthetic Construct
source                  1..133
                        mol_type = protein
                        organism = synthetic construct
SEQUENCE: 20
APASSSTKKT QLQLEHLLLD LQMILNGINN YKNPKLTRML TAKFAMPKKA TELKHLQCLE  60
EELKPLEEVL NGAQSKNFHL RPRDLISNIN IVLELKGSE  TTFMCEYADE TATIVEFLNR 120
WITFAQSIIS TLT                                                               133

SEQ ID NO: 21           moltype = AA  length = 15
FEATURE                 Location/Qualifiers
REGION                  1..15
                        note = Synthetic Construct
source                  1..15
                        mol_type = protein
                        organism = synthetic construct
SEQUENCE: 21
GGGGSGGGGS GGGGS                                                              15

SEQ ID NO: 22           moltype = AA  length = 597
FEATURE                 Location/Qualifiers
REGION                  1..597
                        note = Synthetic Construct
source                  1..597
                        mol_type = protein
                        organism = synthetic construct
SEQUENCE: 22
EVQLLESGGG LVQPGGSLRL SCAASGFSFS SYTMSWVRQA PGKGLEWVAT ISGGGRDIYY  60
PDSVKGRFTI SRDNSKNTLY LQMNSLRAED TAVYYCVLLT GRVYFALDSW GQGTLVTVSS 120
ASTKGPSVFP LAPSSKSTSG GTAALGCLVK DYFPEPVTVS WNSGALTSGV HTFPAVLQSS 180
GLYSLSSVVT VPSSSLGTQT YICNVNHKPS NTKVDKKVEP KSCDKTHTCP PCPAPEAAGG 240
PSVFLFPPKP KDTLMISRTP EVTCVVVDVS HEDPEVKFNW YVDGVEVHNA KTKPREEQYN 300
STYRVVSVLT VLHQDWLNGK EYKCKVSNKA LGAPIEKTIS KAKGQPREPQ VYTLPPCRDE 360
LTKNQVSLWC LVKGFYPSDI AVEWESNGQP ENNYKTTPPV LDSDGSFFLY SKLTVDKSRW 420
QQGNVFSCSV MHEALHNHYT QKSLSLSPGG GGGSGGGGSG GGGSAPASSS TKKTQLQLEH 480
LLLDLQMILN GINNYKNPKL TRMLTAKFAM PKKATELKHL QCLEEELKPL EEVLNGAQSK 540
NFHLRPRDLI SNINIVIVLEL KGSETTFMCE YADETATIVE FLNRWITFAQ SIISTLT    597

SEQ ID NO: 23           moltype = AA  length = 448
FEATURE                 Location/Qualifiers
REGION                  1..448
                        note = Synthetic Construct
source                  1..448
                        mol_type = protein
                        organism = synthetic construct
SEQUENCE: 23
EVQLLESGGG LVQPGGSLRL SCAASGFSFS SYTMSWVRQA PGKGLEWVAT ISGGGRDIYY  60
PDSVKGRFTI SRDNSKNTLY LQMNSLRAED TAVYYCVLLT GRVYFALDSW GQGTLVTVSS 120
ASTKGPSVFP LAPSSKSTSG GTAALGCLVK DYFPEPVTVS WNSGALTSGV HTFPAVLQSS 180
GLYSLSSVVT VPSSSLGTQT YICNVNHKPS NTKVDKKVEP KSCDKTHTCP PCPAPEAAGG 240
PSVFLFPPKP KDTLMISRTP EVTCVVVDVS HEDPEVKFNW YVDGVEVHNA KTKPREEQYN 300
STYRVVSVLT VLHQDWLNGK EYKCKVSNKA LGAPIEKTIS KAKGQPREPQ VCTLPPSRDE 360
LTKNQVSLSC AVKGFYPSDI AVEWESNGQP ENNYKTTPPV LDSDGSFFLV SKLTVDKSRW 420
QQGNVFSCSV MHEALHNHYT QKSLSLSP                                              448

SEQ ID NO: 24           moltype = AA  length = 448
FEATURE                 Location/Qualifiers
REGION                  1..448
                        note = Synthetic Construct
source                  1..448
                        mol_type = protein
                        organism = synthetic construct
SEQUENCE: 24
EVQLLESGGG LVQPGGSLRL SCAASGFSFS SYTMSWVRQA PGKGLEWVAT ISGGGRDIYY  60
PDSVKGRFTI SRDNSKNTLY LQMNSLRAED TAVYYCVLLT GRVYFALDSW GQGTLVTVSS 120
ASTKGPSVFP LAPSSKSTSG GTAALGCLVK DYFPEPVTVS WNSGALTSGV HTFPAVLQSS 180
GLYSLSSVVT VPSSSLGTQT YICNVNHKPS NTKVDKKVEP KSCDKTHTCP PCPAPEAAGG 240
PSVFLFPPKP KDTLMISRTP EVTCVVVDVS HEDPEVKFNW YVDGVEVHNA KTKPREEQYN 300
STYRVVSVLT VLHQDWLNGK EYKCKVSNKA LGAPIEKTIS KAKGQPREPQ VCTLPPSRDE 360
LTKNQVSLSC AVKGFYPSDI AVEWESNGQP ENNYKTTPPV LDSDGSFFLV SKLTVDKSRW 420
QQGNVFSCSV MHEALHNRFT QKSLSLSP                                              448

SEQ ID NO: 25           moltype = AA  length = 218
FEATURE                 Location/Qualifiers
```

```
REGION                  1..218
                        note = Synthetic Construct
source                  1..218
                        mol_type = protein
                        organism = synthetic construct
SEQUENCE: 25
DIVMTQSPDS LAVSLGERAT INCKASESVD TSDNSFIHWY QQKPGQSPKL LIYRSSTLES    60
GVPDRFSGSG SGTDFTLTIS SLQAEDVAVY YCQQNYDVPW TFGQGTKVEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                           218

SEQ ID NO: 26           moltype = AA  length = 115
FEATURE                 Location/Qualifiers
REGION                  1..115
                        note = DP47GS VH
source                  1..115
                        mol_type = protein
                        organism = synthetic construct
SEQUENCE: 26
EVQLLESGGG LVQPGGSLRL SCAASGFTFS SYAMSWVRQA PGKGLEWVSA ISGSGGSTYY    60
ADSVKGRFTI SRDNSKNTLY LQMNSLRAED TAVYYCAKGS GFDYWGQGTL VTVSS        115

SEQ ID NO: 27           moltype = AA  length = 108
FEATURE                 Location/Qualifiers
REGION                  1..108
                        note = DP47GS VL
source                  1..108
                        mol_type = protein
                        organism = synthetic construct
SEQUENCE: 27
EIVLTQSPGT LSLSPGERAT LSCRASQSVS SSYLAWYQQK PGQAPRLLIY GASSRATGIP    60
DRFSGSGSGT DFTLTISRLE PEDFAVYYCQ QYGSSPLTFG QGTKVEIK                108

SEQ ID NO: 28           moltype = AA  length = 215
FEATURE                 Location/Qualifiers
REGION                  1..215
                        note = DP47GS LC
source                  1..215
                        mol_type = protein
                        organism = synthetic construct
SEQUENCE: 28
EIVLTQSPGT LSLSPGERAT LSCRASQSVS SSYLAWYQQK PGQAPRLLIY GASSRATGIP    60
DRFSGSGSGT DFTLTISRLE PEDFAVYYCQ QYGSSPLTFG QGTKVEIKRT VAAPSVFIFP   120
PSDEQLKSGT ASVVCLLNNF YPREAKVQWK VDNALQSGNS QESVTEQDSK DSTYSLSSTL   180
TLSKADYEKH KVYACEVTHQ GLSSPVTKSF NRGEC                              215

SEQ ID NO: 29           moltype = AA  length = 592
FEATURE                 Location/Qualifiers
REGION                  1..592
                        note = DP47GS HC(Fc wt,P329G LALA)-IL2 N88D
source                  1..592
                        mol_type = protein
                        organism = synthetic construct
SEQUENCE: 29
EVQLLESGGG LVQPGGSLRL SCAASGFTFS SYAMSWVRQA PGKGLEWVSA ISGSGGSTYY    60
ADSVKGRFTI SRDNSKNTLY LQMNSLRAED TAVYYCAKGS GFDYWGQGTL VTVSSASTKG   120
PSVFPLAPSS KSTSGGTAAL GCLVKDYFPE PVTVSWNSGA LTSGVHTFPA VLQSSGLYSL   180
SSVVTVPSSS LGTQTYICNV NHKPSNTKVD KKVEPKSCDK THTCPPCPAP EAAGGPSVFL   240
FPPKPKDTLM ISRTPEVTCV VVDVSHEDPE VKFNWYVDGV EVHNAKTKPR EEQYNSTYRV   300
VSVLTVLHQD WLNGKEYKCK VSNKALGAPI EKTISKAKGQ PREPQVYTLP PSRDELTKNQ   360
VSLTCLVKGF YPSDIAVEWE SNGQPENNYK TTPPVLDSDG SFFLYSKLTV DKSRWQQGNV   420
FSCSVMHEAL HNHYTQKSLS LSPGGGGGSG GGGSGGGGSA PASSSTKKTQ LQLEHLLLDL   480
QMILNGINNY KNPKLTRMLT FKFYMPKKAT ELKHLQCLEE ELKPLEEVLN LAQSKNFHLR   540
PRDLISDINV IVLELKGSET TFMCEYADET ATIVEFLNRW ITFAQSIIST LT           592

SEQ ID NO: 30           moltype = AA  length = 133
FEATURE                 Location/Qualifiers
REGION                  1..133
                        note = IL-2 N88D T3A C125A
source                  1..133
                        mol_type = protein
                        organism = synthetic construct
SEQUENCE: 30
APASSSTKKT QLQLEHLLLD LQMILNGINN YKNPKLTRML TFKFYMPKKA TELKHLQCLE    60
EELKPLEEVL NLAQSKNFHL RPRDLISDIN VIVLELKGSE TTFMCEYADE TATIVEFLNR   120
WITFAQSIIS TLT                                                      133

SEQ ID NO: 31           moltype = AA  length = 15
FEATURE                 Location/Qualifiers
```

```
REGION              1..15
                    note = (G4S)3 linker
source              1..15
                    mol_type = protein
                    organism = synthetic construct
SEQUENCE: 31
GGGGSGGGGS GGGGS                                                                15
```